(12) United States Patent
Funawatari et al.

(10) Patent No.: US 6,269,074 B1
(45) Date of Patent: Jul. 31, 2001

(54) CONTAINER CASING FOR DISC-SHAPED RECORDING MEDIUM

(75) Inventors: Takatsugu Funawatari; Daiki Kobayashi; Shuichi Kikuchi, all of Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/269,234

(22) PCT Filed: Jul. 23, 1998

(86) PCT No.: PCT/JP98/03303

§ 371 Date: Jul. 15, 1999

§ 102(e) Date: Jul. 15, 1999

(87) PCT Pub. No.: WO99/05680

PCT Pub. Date: Feb. 4, 1999

(30) Foreign Application Priority Data

| Jul. 24, 1997 | (JP) | 9-199020 |
| Jul. 24, 1997 | (JP) | 9-199021 |
| Jul. 24, 1997 | (JP) | 9-199022 |
| Aug. 22, 1997 | (JP) | 9-226897 |
| Aug. 22, 1997 | (JP) | 9-226898 |
| Aug. 22, 1997 | (JP) | 9-226899 |

(51) Int. Cl.[7] .............................. G11B 3/70; G11B 23/03
(52) U.S. Cl. ........................................ 369/291; 360/133
(58) Field of Search ............................ 360/133; 369/291

(56) References Cited

U.S. PATENT DOCUMENTS 5,526,337   6/1996   Housey et al. .
5,903,542 * 5/1999   Sandell et al. .................... 360/133
6,011,677 * 1/2000   Rose ................................. 360/133

FOREIGN PATENT DOCUMENTS

| 0 277 809 A1 | 8/1988  | (EP) . |
| 0 421 775 A2 | 4/1991  | (EP) . |
| 0 651 390 A2 | 5/1995  | (EP) . |
| 0 768 665 A1 | 4/1997  | (EP) . |
| WO 94/23431  | 10/1994 | (WO) . |
| WO 95/26027  | 9/1995  | (WO) . |

* cited by examiner

Primary Examiner—Allen T. Cao
(74) Attorney, Agent, or Firm—Frommer Lawrence & Haug, LLP.; William S. Frommer; Matthew K. Ryan

(57) ABSTRACT

A container casing exchangeably holding an optical disc that can be loaded on a disc drive device as it holds an optical disc. The container casing includes a casing main member having a disc housing section for holding the disc-shaped recording medium towards its major surface, an aperture for recording and/or reproducing the disc-shaped recording medium held in the disc housing section and a center opening for rotationally driving the disc-shaped recording medium held in the disc housing section. The casing main member rotatably carries a cover member for opening/closing the disc housing section and an opening/closure controlling members. These opening/closure controlling members are moved between the first position engaging with the cover member and the second position disengaged from the cover member to control the opening/closure of the cover member to enable opening/closure of the cover member to enable exchange of the optical disc while assuring the positively closed state of the disc housing section.

29 Claims, 19 Drawing Sheets

CONTAINER CASING FOR DISC-SHAPED RECORDING MEDIUM

TECHNICAL FIELD

This invention relates to a container casing for containing a disc-shaped recording medium, such as an optical disc or a magnetic disc, used as a recording medium for information signals. More particularly, it relates to a container casing for a disc-shaped recording medium which removably holds a disc-shaped recording medium housed in a casing man member and which can be loaded on the disc drive device as it holds the disc-shaped recording medium.

BACKGROUND ART

Up to now, such a disc container casing has been proposed, in which an optical disc or a magnetic disc used as a recording medium for information signals is removably housed in the main casing member and in which the disc-shaped recording medium as it is contained in the casing main member can be loaded on the disc drive device.

As this type of the disc container casing, there is proposed such as casing disclosed in Japanese Laying-Open H-6-68641. The disc container casing, disclosed in this publication, includes a casing main member, having a disc housing section, and a cover member for closing the housing section. The disc housed in the housing section can be introduced or ejected by mounting the cover member for opening/closure with respect to the casing main member.

The disc container casing, disclosed in Japanese laying-Open H-6-68641, has a casing main member on left and right sides of which a pair of flexible cover retention members are unified with the casing main member. These cover retention members are engaged by a pair of retention pawls provided on the cover member for maintaining the closed state of the cover member, that is the state in which the disc housing section of the casing main member is closed by the cover member. By elastically shifting the cover retention members provided on left and right ends along the width and towards the inside of the casing main member, relative engagement of the cover retention member with engagement pawls provided on the cover member is released to enable opening of the disc housing section by the cover member.

Since the disc-shaped recording mediums housed in the casing main member can be exchanged as desired by openably mounting the cover member designed to cover the disc housing section, plural disc-shaped recording mediums can be selectively housed in one container casing for loading on the disc drive device. By providing the sole disc housing section, plural disc-shaped recording mediums can be selectively housed and loaded on the disc drive device, thus furnishing disc-shaped recording mediums at low costs.

Meanwhile, the information handled by an information processing apparatus, such as a computer, is increasing significantly in volume. The disc-shaped recording medium, such as an optical disc, used as a recording medium for information signals, is desired to be able to record a large quantity of the information. On the other hand, an optical disc having the picture information, such as a motion picture, is presented to the market extensively. Since the picture information supplied by a motion picture has an extremely large information volume, attempts are currently made towards increasing the recording capacity per disc for improving the recording density. In the disc-shaped recording medium increased in recording capacity to increase the recording density, attempts are made for narrowing the recoding track pitch or comminuting the signal area.

The disc-shaped recording medium, having a high recording density, is likely to be unable to record and/or reproduce information signals correctly due to deposition of the slightest amount of contaminants or grazing. Therefore, this type of the disc-shaped recording medium is desired to be housed in a disc container casing and to be loaded on the disc drive device as it is housed in the casing. If the disc-shaped recording medium can be loaded on or ejected from the disc drive device as it is housed in the disc container casing, the disc can be positively safeguarded against deposition of contaminants or grazing during handling such as loading or unloading for the disc drive device.

If the totality of the disc-shaped recording mediums are housed in the disc container casing members and offered in this state to the market, a large quantity of the disc container casings are required, such that the disc-shaped recording mediums cannot be furnished inexpensively. Moreover, if the totality of the disc-shaped recording mediums are housed in the disc container casing members, the storage space for the disc-shaped recording mediums is increased, such that the large quantity of disc-shaped recording mediums cannot be housed efficiently, while the circulation costs are also increased.

On the other hand, the disc container casing adapted to be loaded on a disc drive device as the disc-shaped recording medium is housed therein has an aperture to enable recording and/or reproduction for the disc-shaped recording medium housed in the disc housing section of the casing and a center opening via which is intruded a disc table of a disc rotation unit provided on the disc drive device for rotationally driving the disc-shaped recording medium housed in the disc housing section. The casing main member provided with the disc housing section carries a shutter member adapted for opening/closing the recording and/or reproducing aperture and the center opening. The casing main member includes a shutter supporting plate for supporting the distal end of the shutter member to enable the shutter member to be moved in stability along the surface of the casing main member.

DISCLOSURE OF THE INVENTION

It is an object of the present invention to provide a disc container casing which, while reliably protecting the disc-shaped recording medium and enabling loading/unloading thereof for the disc drive device, enables the disc-shaped recording medium housed therein to be exchanged as desired.

It is another object of the present invention to provide a disc container casing in which the disc-shaped recording medium is reliably prevented from being detached from a casing member.

It is another object of the present invention to provide a disc container casing in which a cover member adapted for opening/closing the disc housing section housing the disc-shaped recording medium is prevented from being opened to assure positive protection of the disc-shaped recording medium housed in the casing main member.

It is a further object of the present invention to provide a disc container casing whereby it can be easily discerned whether or not the disc-shaped recording medium housed in the casing main member has been exchanged.

It is a further object of the present invention to provide a disc container casing in which the cover member adapted for opening/closing the disc housing section housing the disc-shaped recording medium can reliably close the disc housing section to prevent contaminants from intruding into the disc housing section to protect reliably the disc-shaped recording medium housed in the disc housing section.

It is a further object of the present invention to provide a disc container casing in which, on opening the disc housing section, the cover member can be reliably held at the disc housing section opening position to enable a facilitated exchange operation for the disc-shaped recording medium.

It is a further object of the present invention to provide a disc container casing in which the shutter supporting plate supporting the distal end of the shutter member movably mounted on the casing main member can be reliably mounted on the casing main member.

It is a further object of the present invention to provide a disc container casing in which the shutter supporting plate and the casing main member carrying the shutter supporting plate can be mounted by fusion to the casing main member without damaging the casing main member.

It is yet another object of the present invention to provide a disc container casing in which, on holding therein the disc-shaped recording medium capable of re-recording information signals, the previously recorded information signals can be reliably prevented for realizing reliable protection of information signals recorded on the disc-shaped recording medium.

For accomplishing the above objects, the present invention provides a container casing for a disc-shaped recording medium for rotatably accommodating the disc-shaped recording medium, including a main casing member having a disc housing section for holding the disc-shaped recording medium on its major surface, an aperture for recording and/or reproducing the disc-shaped recording medium held in the disc housing section and a center opening for rotationally driving the disc-shaped recording medium held in the disc housing section, a cover member mounted on the main casing member for opening/closing the disc housing section, an opening/closure controlling member mounted on one of the casing main member and the cover member, the opening/closure controlling member being movable between a first position of engaging with the other of the casing main member and the cover member for keeping the closed state of the disc housing section by the cover member, and a second position of enabling opening of the cover member, with the opening/closure controlling member being then disengaged from the other of the casing main member and the cover member.

The cover member opening/closing the disc housing section has a center magnetic plate cooperating with a magnet provided on a disc table constituting a disc rotation unit on the disc drive device for chucking the disc-shaped recording medium set on the disc table to rotation in unison with the disc table.

A pair of the opening/closure controlling members are arranged on left and right sides of the casing main member and, when moved to the second position enabling the opening of the cover member, the length of the casing main member in a direction perpendicular to the direction of insertion thereof into the disc drive device is set so as to be longer than the length in the inserting direction of the casing main member into the disc drive device, for controlling the direction of insertion of the container casing into the disc drive device.

The opening/closure controlling member includes a first operating portion on its one end in the movement direction for moving the opening/closure controlling member to the first position. On the opposite end in the movement direction of the opening/closure controlling member, there is provided an engagement projection engaged in an opening provided in the casing main member or the cover member to maintain the cover member in the state of closing the disc housing section when the opening/closure controlling member is moved to the first position.

The opening/closure controlling member includes a second operating portion for moving the opening/closure controlling member to the second position at an end face of the opening/closure controlling member in the direction perpendicular to the movement direction, and positioning means at the opposite end face in the direction perpendicular to the movement direction for engaging with an engagement portion provided on the casing main member when the opening/closure controlling member is moved to the first or second position.

The container casing for the disc-shaped recording medium according to the present invention further includes an opening control pin movable between an opening controlling position for controlling movement of the opening/closure controlling member from the first position to the second position to control the opening of the cover member and an opening enabling position for enabling movement of the opening/closure controlling members from the first position to the second position to enable opening of the cover member.

An opening passed through by the opening control pin is provided in each of the casing main member and the opening/closure controlling member. When positioned in the opening controlling position, the opening controlling pin is inserted through the opening in the casing main member and the opening in the opening/closure controlling member. When positioned in the opening enabling position, the opening controlling pin is moved to a position inserted in the opening in the opening/closure controlling member.

For accomplishing the above objects, the present invention also provides a container casing for rotatably accommodating a disc-shaped recording medium, including a main casing member having a disc housing section for holding the disc-shaped recording medium on its major surface, an aperture for recording and/or reproducing the disc-shaped recording medium held in the disc housing section and a center opening for rotationally driving the disc-shaped recording medium held in the disc housing section, a shutter member movably mounted on the casing main member for opening/closing the aperture and the center opening, a shutter supporting member for supporting one end of the shutter member, a cover member mounted on the main casing member for opening/closing the disc housing section and an opening/closure controlling member mounted on one of the casing main member and the cover member, the opening/closure controlling member being movable between a first position of engaging with the other of the casing main member and the cover member for keeping the closed state of the disc housing section by the cover member, and a second position of enabling opening of the cover member, with the opening/closure controlling member being then disengaged from the other of the casing main member and the cover member.

The opening/closure controlling member has a hole for producing a spacing to permit elastic deformation thereof in a direction perpendicular to the thrusting direction into the casing main member to enable thrusting engagement thereof into the casing main member, and the shutter member has a protrusion introduced into the hole of the opening/closure controlling member. The protrusion is introduced into the hole of the opening/closure controlling member to prevent detachment of the opening/closure controlling member from the casing main member or the cover member.

The shutter supporting member is mounted on the casing main member so that one end of the shutter supporting member is spaced a pre-set gap from the surface of the casing main member along the movement direction of the shutter member. The shutter member has its one end inserted into the gap to prevent the shutter member from being detached from the surface of the casing main member. An interrupted weld projection having at least one cut-out is provided on a connection surface of the shutter supporting member or the casing main member, while the other connection surface is roughed.

The shutter supporting member is mounted on the casing main member so that one end of the shutter supporting member is spaced a pre-set gap from the surface of the casing main member along the movement direction of the shutter member. The shutter member has its one end inserted into the gap to prevent the shutter member from being detached from the surface of the casing main member. Both ends of the shutter supporting member covering one end of the shutter member are provided with weld points for ultrasonic welding. Both corners in the movement direction of one end of the shutter member have cut-outs for preventing conflict with the weld points for ultrasonic welding.

The container casing for the disc-shaped recording medium according to the present invention includes a main casing member having a disc housing section for holding the disc-shaped recording medium towards its major surface, an aperture for recording and/or reproducing the disc-shaped recording medium held in the disc housing section and a center opening for rotationally driving the disc-shaped recording medium held in the disc housing section. The container casing also includes a cover member rotatably mounted via a fulcrum on the casing main member for opening/closing the disc housing section and a mistaken recording inhibiting member positioned for enabling recording of information signals on the disc-shaped recording medium housed in the disc housing section or inhibiting recording of information signals on the disc-shaped recording medium. The casing main member has a mistaken recording inhibiting member container formed by forming an insertion opening on a lateral side perpendicular to the major surface thereof defining the disc housing section. The mistaken recording inhibiting member is introduced into the casing main member from the lateral side of the casing main member via the insertion opening.

The container casing also includes an opening communicating with the mistaken recording inhibiting member container in each of the one and other major surfaces of the casing main member. The mistaken recording inhibiting member has an exposed portion exposed to a lateral side of the casing main member and first and second elastic deformation pieces extended from the exposed portion for elastic deformation in a direction towards and away from each other. The first elastic deformation piece is exposed to outside via the opening.

The mistaken recording inhibiting member has an exposed portion exposed to a lateral side of the casing main member and first and second elastic deformation pieces extended from the exposed portion for elastic deformation in a direction towards and away from each other. The second elastic deformation piece has means for positioning the mistaken recording inhibiting member. The mistaken recording inhibiting member container has an engagement portion engaged with the positioning means. The positioning means engages with the engagement means when the mistaken recording inhibiting member is at a position of enabling recording information signals on a disc-shaped recording medium held in the container casing or at a position inhibiting recording of information signals on the disc-shaped recording medium.

A container casing for rotatably housing a disc-shaped recording medium includes a main casing member having a disc housing section for holding the disc-shaped recording medium towards its major surface, an aperture for recording and/or reproducing the disc-shaped recording medium held in the disc housing section and a center opening for rotationally driving the disc-shaped recording medium held in the disc housing section. The container casing also includes a cover member rotatably mounted via a fulcrum on the casing main member for opening/closing the disc housing section. There is also provided rotation controlling means on the fulcrum for holding the cover member at a position of opening the disc housing section when the cover member is rotated to a position of opening the disc housing section.

The rotation controlling means is a projection provided on a rotary shaft and the cover member is controlled in its rotation by abutment of the projection on at least a portion of the cover member for controlling rotation of the cover member.

The rotary shaft is provided on the cover member and the casing main member has an elastic clamping portion which is elastically deformed for clamping the rotary shaft. The cover member has the rotary shaft clamped by the elastic clamping portion for being rotatably mounted on the casing main member. The projection compresses against at least a portion of the elastic clamping portion for controlling rotation of the cover member.

Other objects and advantages of the present invention will become clearer from the following explanation of preferred embodiment of the invention.

BEST MODE FOR CARRYING OUT THE INVENTION

Figure 1:
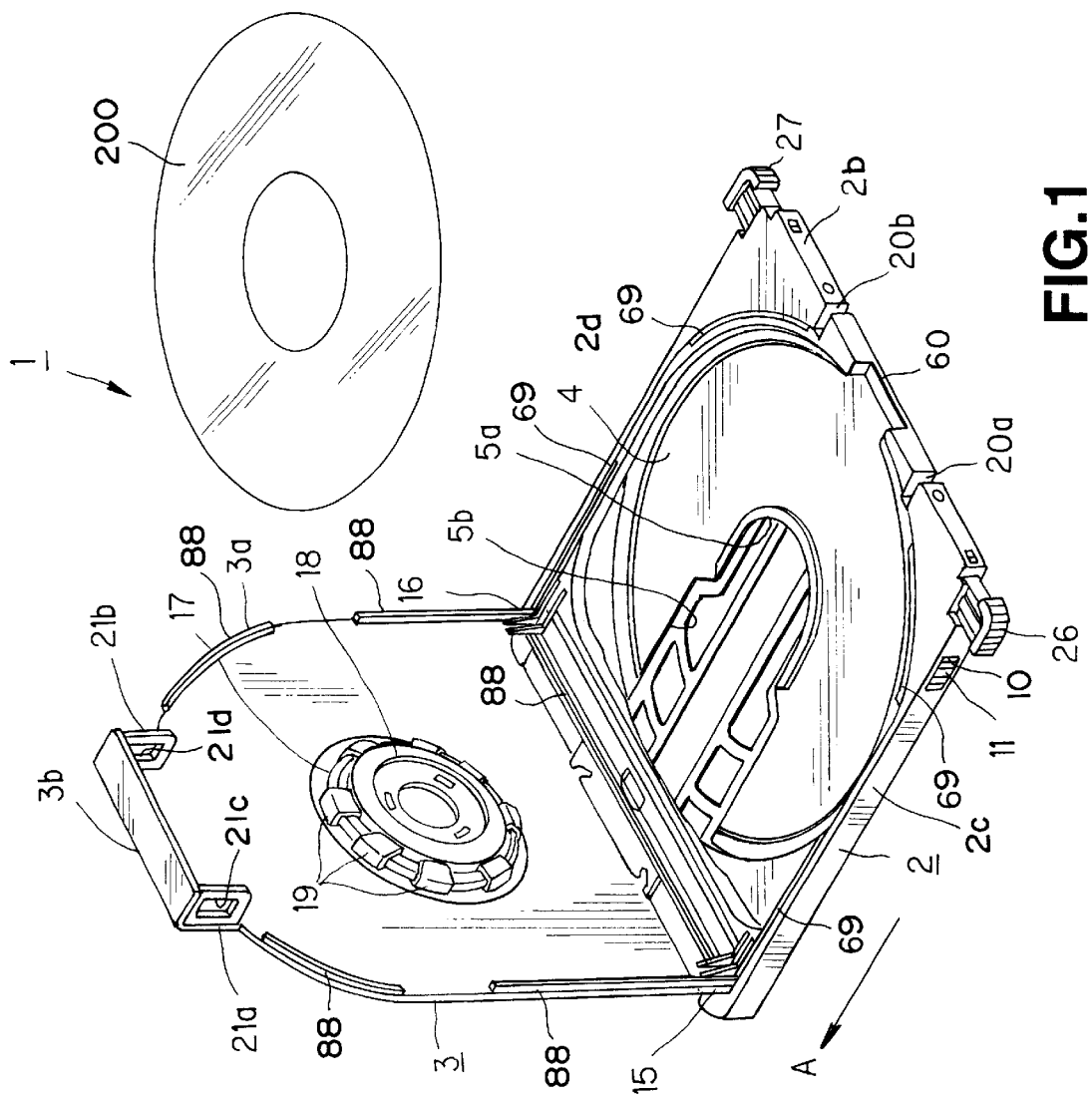
FIG. 1 is a perspective view showing the state of opening of the cover member for the disc container casing according to the present invention.

Referring to the drawings, a disc container casing of the present invention will be explained in detail.

The disc container casing according to the present invention is adapted for housing an optical disc enabling recording of information signals.

Specifically, the disc container casing can be loaded on a disc drive device as it holds an optical disc.

Referring to FIG. 1, a container casing 1 has a casing main member 2 for holding an optical disc 200 capable of recording data such as picture information or speech information. The casing main member 2 is formed by molding a synthetic resin material substantially in the form of a rectangle. At a mid portion on a major surface of the casing main member 2 is formed a disc housing section 4 so as to inscribe the casing main member 2. The disc housing section 4 is formed in a recessed circular shape substantially coextensive as the outer shape of the optical disc 200 accommodated therein. This casing main member 2 carries a cover member 3 for opening or closing a disc housing section 4 in a thin plate shape molded from synthetic resin material.

Figure 2:
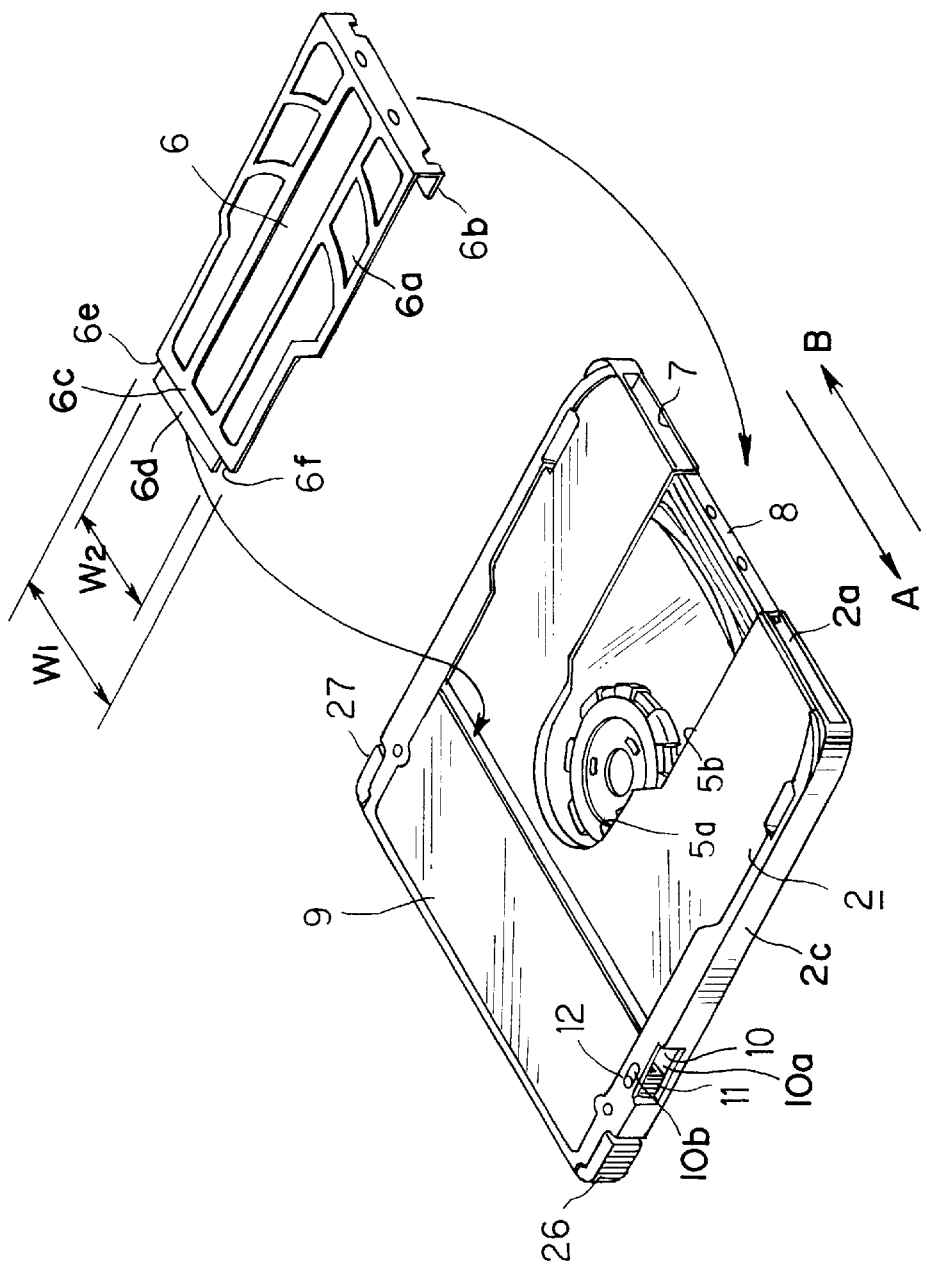
FIG. 2 is a perspective view showing the side of the disc container casing having a recording and/or reproducing aperture and specifically showing the state in which the shutter member has been detached from the casing main member.

At a mid portion of the disc housing section 4 provided in the casing main member 2 is formed a center opening 5a in which is intruded a disc table of a disc rotation unit provided on a disc drive device adapted for rotating an optical disc 200 housed in the disc housing section 4. The center opening 5a is substantially circular in profile, as shown in FIGS. 1 and 2. In the bottom of the disc housing section 4 is formed a recording and/or reproducing aperture 5b for exposing at least a portion of a signal recording area of the optical disc 200 housed in the disc housing section 4 across the inner and outer rims of the disc. This aperture 5b is at the center in the left-and-right direction of the casing main member 2, as shown in FIGS. 1 and 2, and is substantially rectangular in profile in continuation to the center opening 5a for extending to the vicinity of a front surface 2a of the casing main member 2 operating as an inserting end of the container casing 1 into the disc drive device.

In the back side 2b of the casing main member 2 opposite to the front side 2a operating as the inserting end to the disc drive device is formed a recess 60 operating as a finger support on the outer rim portion of the optical disc 200, as shown in FIG. 1. The finger support recess 60 is positioned at a mid portion in the left-and-right direction of the casing main member 2 and is formed by cutting out a portion of the casing main member 2 extending from the disc housing section 4 to the back side 2b. By providing the finger support recess 60 in the casing main member 2, the user can set his or her finger via the finger support recess 60 on the outer rim of the optical disc 200 housed in the disc housing section 4 so that the optical disc 200 held without gap in the disc housing section 4 can be taken out easily.

On the casing main member 2 is movably mounted a shutter member 6 adapted for opening/closing the center opening 5a and the recording and/or reproducing aperture 5b. Referring to FIG. 2, the shutter member 6 is formed by punching a thin metal sheet and is comprised of a substantially rectangular shutter portion 6a sufficiently large-sized to close the center opening 5a and the recording and/or reproducing aperture 5b. The proximal end of the shutter portion 6a is bent to form a substantially U-shaped holding portion 6b fitted on the front side 2a of the casing main member 2. On one end of the shutter portion 6a is protuberantly formed a movement guide piece 6d via a bent step 6c. On both sides of the movement guide piece 6d are formed cut-outs 6e, 6f, so that the movement guide piece 6d is formed to a width W2 smaller than the end side width W1 of the shutter portion 6a.

The shutter member 6 is mounted on the casing main member 2 by extending the shutter portion 6a over the opposite major surface of the casing main member 2 to close the center opening 5a and the recording and/or reproducing aperture 5b and by fitting the holding portion 6b on the proximal end of the shutter portion 6a to the front side 2a of the casing main member 2. The shutter member 6 is mounted on the casing main member 2 by securing the holding portion 6b to a slider 8 movably mounted in a guide groove 7 formed for extending along the width of the casing main member 2. Thus, the shutter member 6 can be moved in unison with the slider 8 in the direction indicated by arrows A and B in FIG. 2 for opening or closing the center opening 5a and the recording and/or reproducing aperture 5b along the front side 2a of the casing main member 2. The shutter member 6 is biased for movement in the direction indicated by arrow B in FIG. 2 for perpetually closing the center opening 5a and the recording and/or reproducing aperture 5b by the slider 8 being biased in the direction indicated by arrow B in FIG. 2 by a biasing member, not shown, provided in the casing main member 2. Since the shutter member 6 is perpetually biased in the direction of perpetually closing the center opening 5a and the recording and/or reproducing aperture 5b, there is no risk of the opening 5a or the aperture 5b from being inadvertently opened thus reliably protecting the optical disc 200 held in the casing main member 1.

When the container casing 1 is inserted into the disc drive device, the shutter member 6 is moved by a shutter opening/closing unit provided on the disc drive device in the direction indicated by arrow A in FIG. 2, against the bias of a biasing member, to open the center opening 5a and the recording and/or reproducing aperture 5b.

The shutter member 6 has a movement guide piece 6d on one end of the shutter portion 6a supported by a shutter supporting plate 9 mounted on the opposite major surface of the casing main member 2. Thus, the shutter member 6 is prevented from being rotated about the holding portion 6b in a direction in which one end of the shutter portion 6a is spaced apart from the casing main member 2 about the holding portion 6b, so that the shutter member 6 can be moved in stability along the opposite major surface of the casing main member 2.

The shutter supporting plate 9 will be explained later in detail.

On a corner of the lateral side 2c close to the back side 2b of the casing main member 2 is formed a mistaken recording inhibiting member accommodating portion 10, within which is accommodated a mistaken recording inhibiting member 11 for movement between a position enabling recording of information signals on the optical disc 200 held in the casing main member 2 and a position inhibiting recording of information signals on the optical disc 200. The mistaken recording inhibiting member accommodating portion 10 is formed with a first opening 10a opening on the lateral side 2c and a second opening 10b opening on the opposite side major surface of the casing main member 2.

Figure 4:
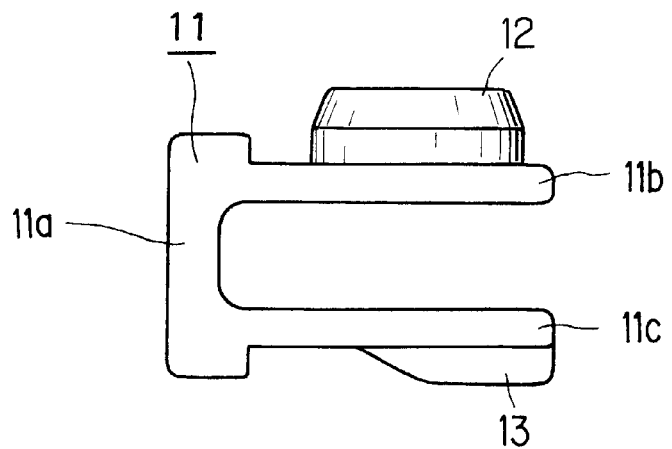
FIG. 4 is a side view showing the mistaken recording inhibiting member.

The mistaken recording inhibiting member 11 movably accommodated in the mistaken recording inhibiting member accommodating portion 10 is molded from a synthetic resin material and has on its proximal end an operating portion 11a exposed to outside via the first opening 10a formed in the lateral side 2c of the casing main member 2, as shown in FIG. 4. From both sides of the operating portion 11a, first and second elastically deformable pieces 11b, 11c are extended parallel to each other. The first elastically deformable piece 11b is provided with a detection unit 12 detected by a mistaken recording inhibiting unit provided on the disc drive device when the container casing 1 is loaded on the disc drive device. The detection unit 12 is constituted by forming a protrusion on the outer lateral surface of the first elastically deformable piece 11b. The second elastically deformable piece 11c is provided with a positioning protrusion 13 which, when the mistaken recording inhibiting member 11 accommodated in the mistaken recording inhibiting member accommodating portion 10 is moved to a position enabling recording of information signals on the optical disc 200 and a position inhibiting recording of information signals on the optical disc 200, controls movement of the mistaken recording inhibiting member 11 at the respective positions.

Figure 5:
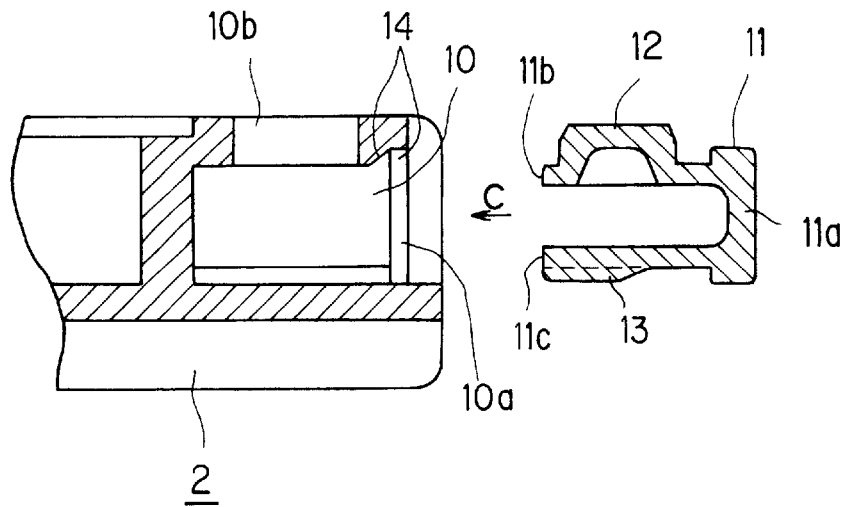
FIG. 5A is a cross-sectional view for illustrating the operation of mounting the mistaken recording inhibiting member on the casing main member prior to mounting on the casing main member.
FIG. 5B is a cross-sectional view showing the state in which the mistaken recording inhibiting member is being inserted into the casing main member and FIG. 5C is a cross-sectional view showing the state n which the mistaken recording inhibiting member has been mounted on the casing main member.
Figure 5:
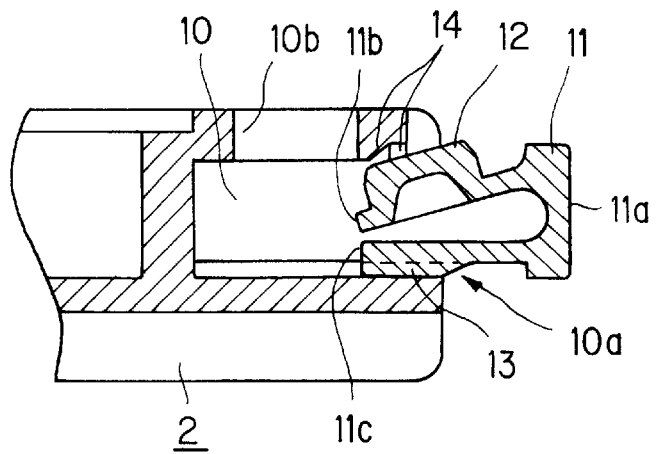
Figure 5:
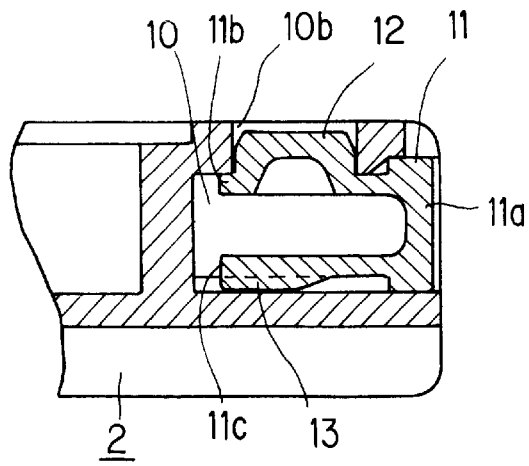

The mistaken recording inhibiting member 11 is introduced into the mistaken recording inhibiting member accommodating portion 10 by being thrust from the distal ends of the first and second elastically deformable pieces 11b, 11c via the first opening 10a formed in the casing main member 2, as shown in FIG. 5A, in the direction indicated by arrow C in FIG. 5A. That is, when introduced into the mistaken recording inhibiting member accommodating portion 10 via the first opening 10a, the mistaken recording inhibiting member 11 is elastically displaced in a direction of approaching to the second elastically deformable pieces 11c under guidance by a guide surface 14 provided on the opening edge of the first opening 10a. When the detection unit 12 provided on the first elastically deformable piece 11b traverses the first opening 10a, the first elastically deformable piece 11b is elastically restored so that the detection unit 12 is engaged with the second opening 10b and hence the mistaken recording inhibiting member 11 is accommodated in a detachment inhibited state in the mistaken recording inhibiting member accommodating portion 10.

Figure 3:
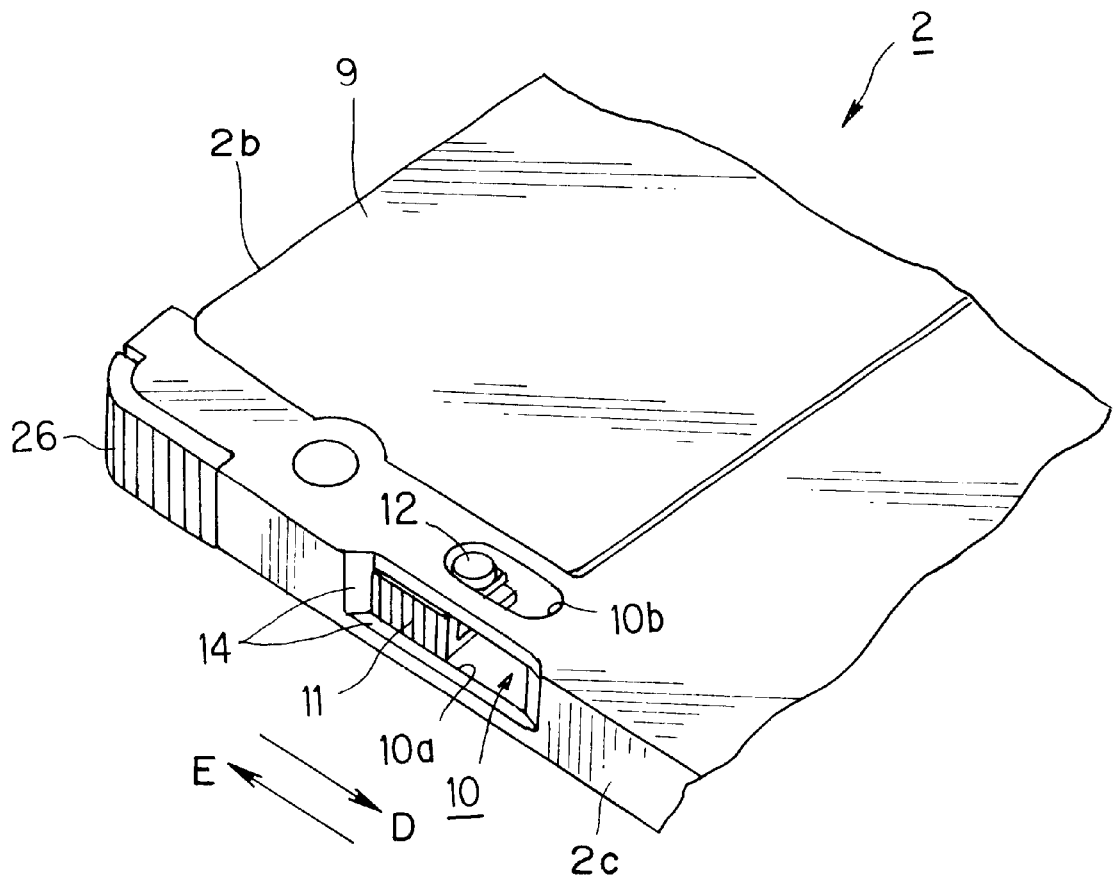
FIG. 3 is a partial perspective view of the disc container casing showing a mistaken recording inhibiting member mounted on the casing main member.

When accommodated in the mistaken recording inhibiting member accommodating portion 10, the mistaken recording inhibiting member 11 has its proximal side operating portion 11a exposed to outside of the lateral side 2c of the casing main member 2 via the second opening 10b, with the detection unit 12 facing the opposite side major surface of the casing main member 2 via the second opening 10b, as shown in FIGS. 3 and 5C. By gripping and moving the operating portion 11a exposed to outside of the casing main member 2 via the second opening 10b, the mistaken recording inhibiting member 11 is moved within the mistaken recording inhibiting member accommodating portion 10 in the direction indicated by arrow D or E in FIG. 3. By the mistaken recording inhibiting member 11 being moved in the direction indicated by arrow D or E in FIG. 3, the position of the detection unit 12 facing the inside of the second opening 10b is varied to change the opening position within the second opening 10b. The state enabling recording of information signals on the optical disc 200 held in the disc housing section 4 and the state inhibiting recording of information signals on the optical disc 200 are obtained by varying the position of the detection unit 12.

On the inner lateral surface of the mistaken recording inhibiting member accommodating portion 10 are formed a first engagement portion and a second engagement portion, not shown. The first engagement portion is engaged by the positioning protrusion 13 provided on the second elastically deformable pieces 11c of the mistaken recording inhibiting member 11 when the mistaken recording inhibiting member 11 is moved to the position of inhibiting recording information signals on the optical disc 200. The second engagement portion is engaged by the positioning protrusion 13 when the mistaken recording inhibiting member 11 is moved to the position enabling recording of information signals on the optical disc 200. By providing the first and second engagement portions, engaged by the positioning protrusion 13, the mistaken recording inhibiting member 11 can be reliably held in the recording enabling position or in the recording inhibiting position, thus preventing mistaken erasure of information signals recorded on the optical disc 2 held in the disc housing section 4.

Figure 6:
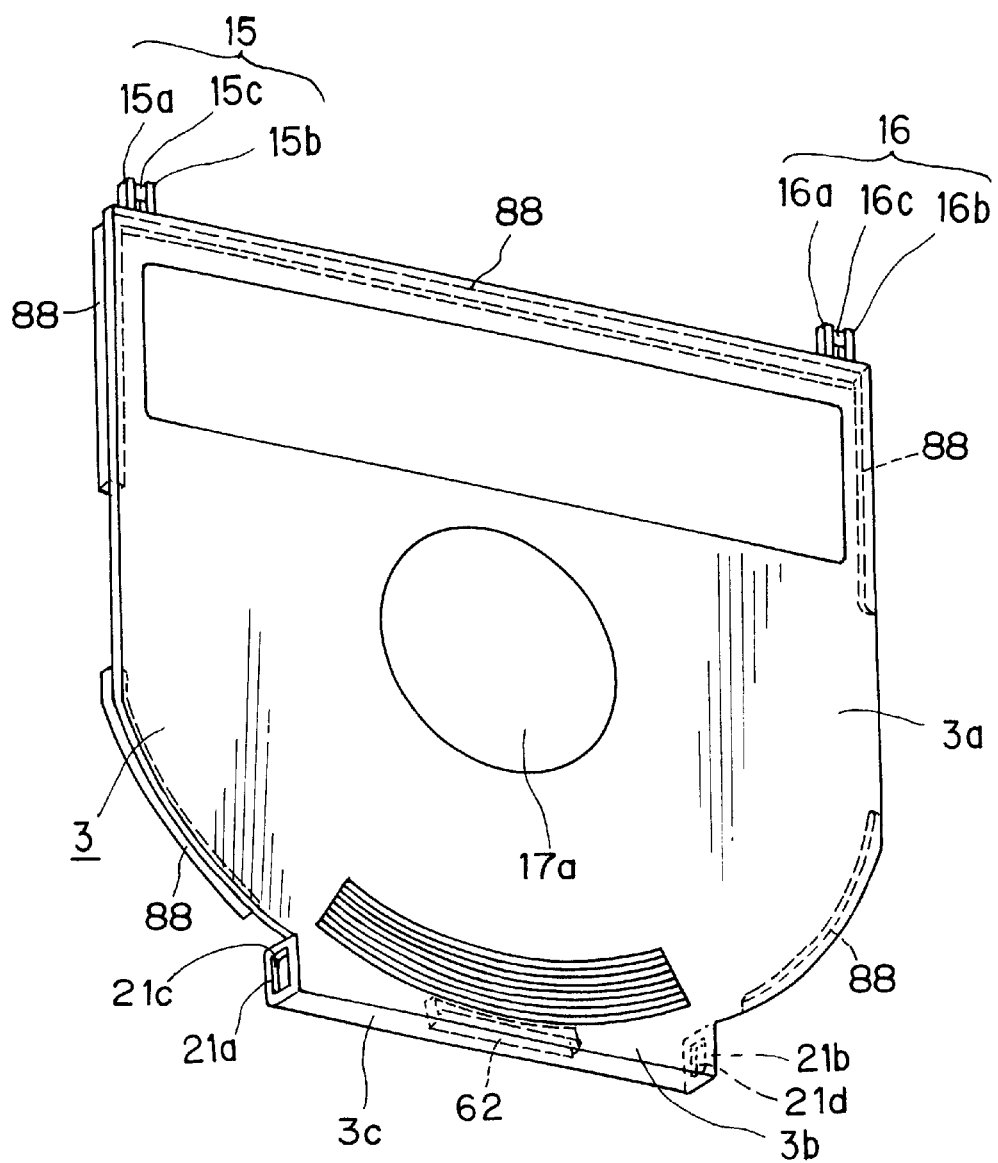
FIG. 6 is a perspective view showing a cover member mounted on the casing main member.

On the casing main member 2, there is rotatably mounted the cover member 3 for opening/closing the disc housing section 4. The cover member 3 has a main cover member 3a which is formed of a transparent synthetic resin material to permit the optical disc 200 housed in the disc housing section 4 to be viewed from outside. The main cover member 3a is sized sufficiently to close the disc housing section 4, as shown in FIG. 6. On the distal end side of the main cover member 3a is formed a protrusion 3b protruded from the disc housing section 4 towards the back side 2b of the casing main member 2 when the cover member 3 closes the disc housing section 4. The distal end of the protrusion 3b carries a depending piece 3c facing the back side 2b of the casing main member 2 when the cover member 3 closes the disc housing section 4. On the inner lateral side of the depending piece 3c is formed a fitting projection 62 fitted in the finger support recess 60 provided on the back side of the casing main member 2 when the cover member 3 closes the disc housing section 4. On left and right sides of the depending piece 3 c are formed a pair of engagement pieces 21a, 21b engaged in a pair of engagement grooves 20a, 20b formed in the back side 2b of the casing main member 2, when the cover member 3 is overlapped on the casing main member 2 to close the disc housing section 4, as shown in FIGS. 1 and 6. On left and right sides of the depending piece 3c, the engagement pieces 21a, 21b are connected to the depending piece 3c and the protrusion 3b. In the engagement pieces 21a, 21b are formed engagement openings 21c, 21d engaged by engagement distal ends of an opening/closure control member as later explained. The cover member 3 is regulated in its opening movement by opening/closure control members engaging in the engagement openings 21c, 21d.

Figure 7:
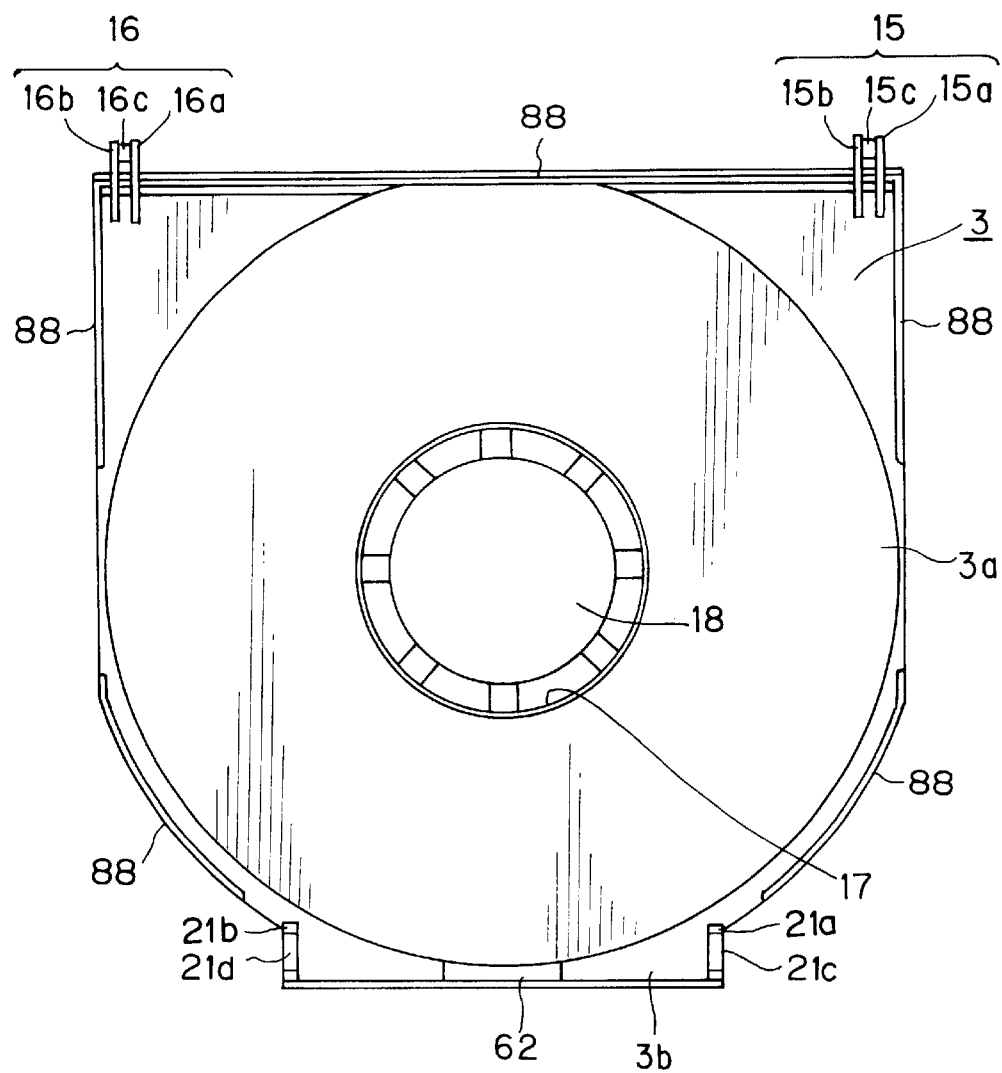
FIG. 7 is a plan view showing the inner surface of the cover member.

On left and right sides of the proximal sides of the main cover member 3a are protuberantly formed a pair of mounting units 15, 16 for mounting the cover member 3 on the casing main member 2. These mounting units 15, 16 are provided with paired protruding pieces 15, 15b, 16a, 16b projected outwards from the proximal end of the main cover member 3a and shank portions 15c, 16c interconnecting the protruding pieces 15a, 15b, 16a, 16b, as shown in FIG. 7. The cover member 3 is mounted via the mounting units 15, 16 on the casing main member 2 and is rotatably supported thereon with the shank portions 15c, 16c as center of rotation. The protruding pieces 15a, 15b, 16a, 16b making up the mounting units 15, 16 are disposed at the proximal ends thereof within the main cover member 3a and are extended at the distal ends thereof from the distal end of the main cover member 3a towards outside in parallel with one another. Between the paired protruding pieces 15a, 15b and the paired protruding pieces 16a, 16b are provided the shank portions 15c, 16c for interconnecting the protruding pieces 15a, 15b, 16a, 16b. These shank portions 15c, 16c have both end portions connected to the protruding pieces 15a, 15b, 16a, 16b so as to be connected between the paired protruding pieces 15a, 15b and the paired protruding pieces 16a, 16b. On the peripheral surfaces of the shank portions 15c, 16c are provided rotation-limiting lugs 68, 69 constituting rotation limiting means limiting the rotation of the cover member 3, as will be explained subsequently.

Referring to FIGS. 6 and 7, the main cover member 3a of the cover member 3 has its portion from the center to the distal end formed arcuately in meeting with the circular disc housing section 4, while having its portion from the center portion to the proximal end formed in a rectangular shape in meeting with the outer shape of the casing main member 2. On the inner surface of the main cover member 3a is formed a rib 88 along its outer rim as shown in FIG. 7. Although the rib 88 provided on the cover member 3 is formed as-one with the main cover member 3a, it may also be unified to the inner surface of the main cover member 3a such as with an adhesive.

Figure 8:
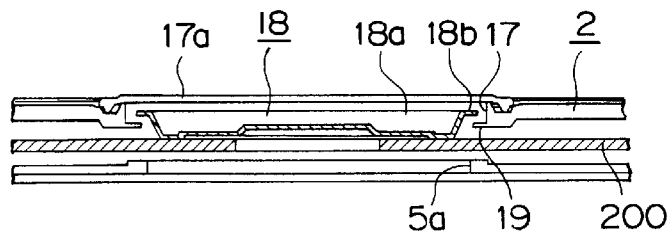
FIG. 8 is a cross-sectional view of the disc container casing showing the state in which a chuck plate has been mounted on the cover member.

Referring to FIGS. 1, 6 and 7, there is mounted on a mid portion of the cover member 3 a chuck plate 18 of a magnetic material, such as iron, adapted for chucking the optical disc 200 held in the disc housing section 4 in cooperation with the disc table provided on the disc drive device side for rotation in unison with the disc table when the container casing 1 is loaded on the disc drive device. The chuck plate 18 has a substantially saucer-shaped main plate member 18a, and is formed on the outer rim of the proximal end of the plate member 18a, as shown in FIG. 8. the chuck plate 18 is arranged on the cover member 3 by being fitted in a fitting hole 17 provided at a mid portion of the cover member 3, with the distal end of the main plate member 18a projecting towards the inner surface of the cover member 3, and by having its flange portion 18b retained by a retention piece 19 protuberantly formed on the rim of the fitting hole 17. The chuck plate 18, fitted in the fitting hole 17, is mounted on the cover member 3 in a manner free from descent from the cover member 3, by a descent inhibiting plate 17a connected to the surface of the cover member 3 so as to overlie the fitting hole 17. Since the fitting hole 17 has a diameter greater than the outer diameter of the chuck plate 18, and the gap between the cover member 17a and the retention piece 19 is sufficiently larger than the thickness of the flange portion 18b of the chuck plate 18, the chuck plate 18 can be moved both in the radial and thickness directions and is rotatably supported by the cover member 3.

Figure 9:
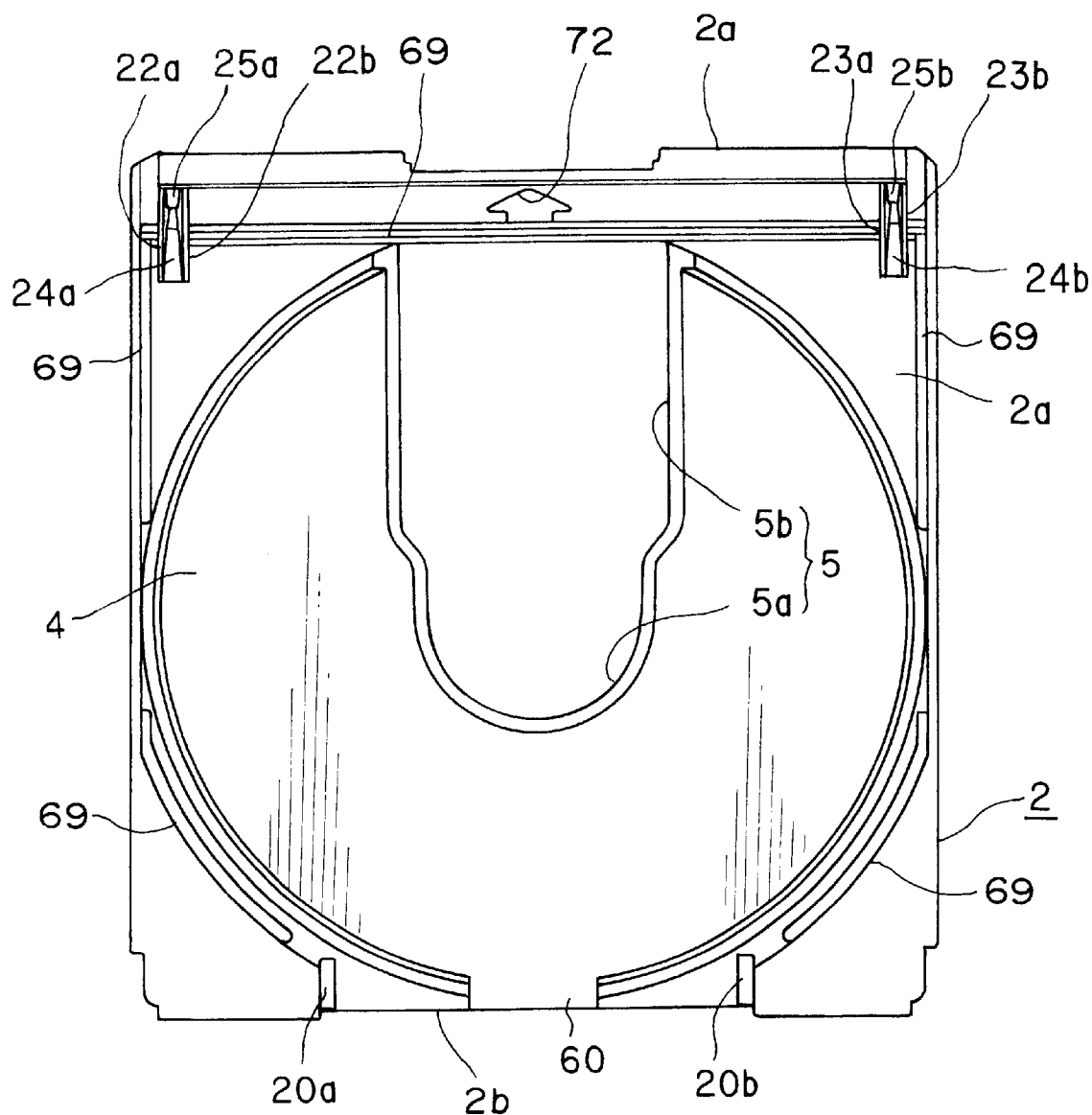
FIG. 9 is a plan view of the casing main member constituting the disc container casing according to the present invention.

The casing main member 2, provided with the disc housing section 4 and having the cover member 3 rotatably mounted thereon for opening/closing the disc housing section 4, is provided with a groove 69 on the outer periphery of the disc housing section 4, as shown in FIG. 9, so that the rib 88 provided on the cover member 3 is engaged in the groove 69, as shown in FIG. 9. This groove 69 is shaped so as to correspond to the rib 88 in shape to permit reliable engagement of the rib in the groove 69 when the cover member 3 closes the disc housing section 4. On the opening end side of the groove 69 is formed an arcuate or inclined surface to facilitate fitting of the rib 88.

With the container casing 1 according to the present invention, when the cover member 3 closes the disc housing section 4, the fitting protrusion 62 provided on the depending piece 3c of the cover member 3 is fitted in the finger support recess 60 provided on the casing main member 2, and the rib 88 fits in the groove 69 in the casing main member 2. Thus, the disc housing section 4 can be hermetically sealed to prevent contaminants from entering the inside of the disc housing section 4 to protect the optical disc 200 held in the disc housing section 4.

In the above-described container casing 1 for discs, the groove 69 is provided in the casing main member 2 and the rib 88 fitting in the groove 69 is provided on the cover member 3. Alternatively, the groove 69 and the protrusion 88 may be reversed such that these may be provided on the casing main member 2 and on the cover member 3, respectively.

Figure 10:
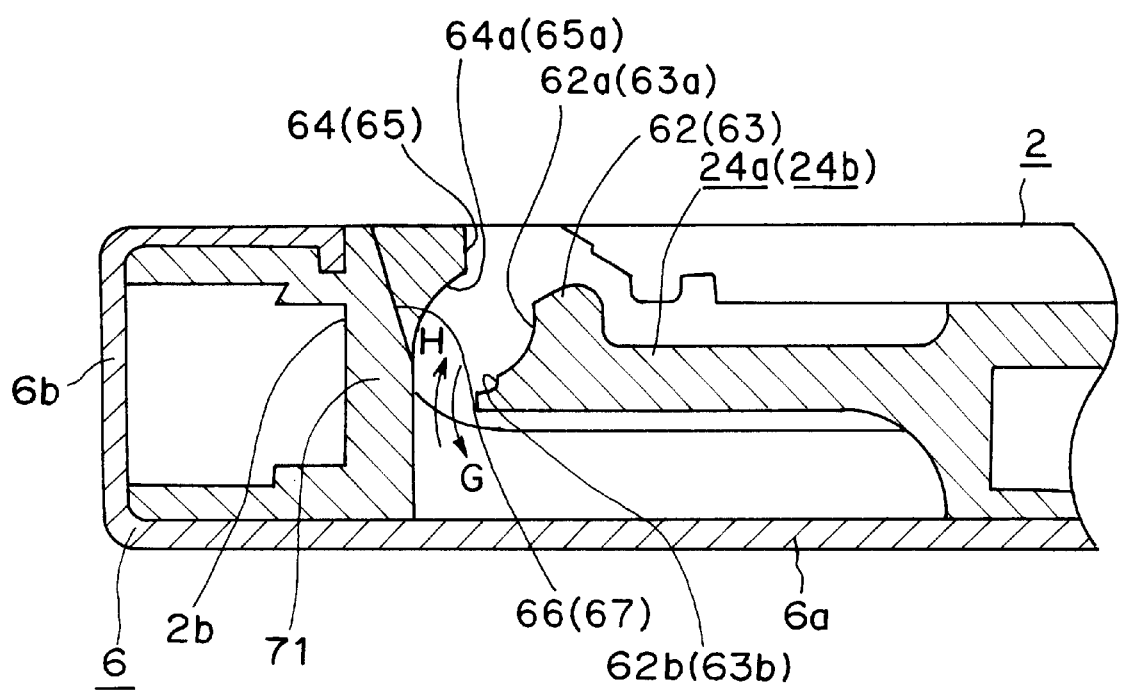
FIG. 10 is a cross-sectional view showing the cover mounting portion of the casing main member.

The casing main member 2 is provided on left and right sides on its front side 2a with paired engagement grooves 22a, 22b and 23a, 23b engaged by the protruding pieces 15a, 15b and 16a, 16b making up the paired mounting units 15, 16 of the cover member 3. Between the engagement grooves 22a, 22b and 23a, 23b are provided shank supporting pieces 24a, 24b elastically deformable in the direction indicated by arrows G and H in FIG. 10 which is the direction of thickness of the casing main member 2 extending from one to the other major surface of the casing main member 2. These shank supporting pieces 24a, 24b have proximal ends connected to the casing main member 2 and are elastically deformable in the direction indicated by arrows G and H in FIG. 10 about the connecting side to the casing main member 2 as the center of rotation, as shown in FIG. 10. The free ends of the shank supporting pieces 24a, 24b are protruded into a spacing area defined between paired grooves 22a, 22b or into a spacing area defined between the paired grooves 23a, 23b so as to face an upstanding wall section 71 constituting the front side 2a of the casing main member 2. On the end face sides of the shank supporting pieces 24a, 24b and on the facing side of the upstanding wall section 71 faced by the end faces of the shank supporting pieces 24a, 24b are formed shank engagement recesses 62a, 63a, 64a, 65a of arcuate cross-section engaged by the shank portions 15c, 16c of the cover member 3. On one sides of the shank engagement recesses 62a, 63a, 64a, 65a are formed retention projections 62, 63, 64, 65 for preventing extrication of the shank portion 15c, 16c engaged in the shank engagement recesses 62a, 63a, 64a, 65a. The separation between the shank engagement recesses 62a, 63a formed on the end faces of the shank supporting pieces 24a, 24b and that between the shank engagement recesses 64a, 65a formed on the upstanding wall section 71 are selected to be slightly smaller than the diameters of the shank portions 15c, 16c of the cover member 3.

On the sides of the upstanding wall section 71 formed with the shank engagement recesses 64a, 65a are formed rotation amount controlling wall sections 66, 67 which, when the cover member 3 mounted on the casing main member 2 is rotated about the shank portions 15c, 16c in the direction of opening the disc housing section 4, are abutted against the protruding pieces 15a, 15b and 16a, 16b provided on the cover member 3 for regulating the rotational position of the cover member 3, as shown in FIG. 10.

At a center portion of the casing main member 2 towards the front side 2a of the major surface of the casing main member 2 is formed an inserting direction indicating portion 72, such as by scoring or printing, for indicating the direction of insertion into the disc drive device of the container casing 1, as shown in FIG. 9.

The state of mounting the cover member 3 for opening or closing the disc housing section 4 on the casing main member 2 is explained.

For mounting the cover member 3 on the casing main member 2, the protruding pieces 15a, 15b, 16a, 16b of the paired mounting units 15, 16 provided on the cover member 3 are engaged in the grooves 22a, 22b, 23a, 23b provided in the casing main member 2. Since the separation between the shank engagement recesses 62a, 63a formed on the end faces of the shank supporting pieces 24a, 24b and the shank engagement recesses 64a, 65a formed on the upstanding wall section 71 is slightly smaller than the diameter of the shank portions 15c, 16c of the cover member 3, the shank portions 15c, 16c of the cover member 3 are abutted against the upper surfaces of the retention projections 62, 63 of the shank supporting pieces 24a, 24b. If the cover member 3 is thrust in this state in the direction indicated by arrow J in FIG. 11 towards the opposite major surface of the casing main member 2, the shank supporting pieces 24a, 24b are elastically moved in the direction indicated by arrow G in FIGS. 10 and 11 to increase the separation between the shank engagement recesses 62a, 63a formed on the end faces of the shank supporting pieces 24a, 24b and the shank engagement recesses 64a, 65a formed in the upstanding wall section 71 so that the shank portions 15c, 16c are engaged between the shank engagement recesses 62a, 63a and 64a, 65a. When the shank portions 15c, 16c are engaged between the shank engagement recesses 62a, 63a and 64a, 65a to remove the thrusting by the shank portions 15c, 16c, the shank supporting pieces 24a, 24b are elastically restored in the direction indicated by arrow H in FIGS. 10 and 11. When the shank supporting pieces 24a, 24b are elastically restored, the shank portions 15c, 16c are thrust and clinched between the shank engagement recesses 62a, 63a and 64a, 65a, as by being thrust by the shank supporting pieces 24a, 24b against the upstanding wall section 71, to prevent detachment from the shank engagement recesses 62a, 63a and 64a, 65a.

Figure 11:
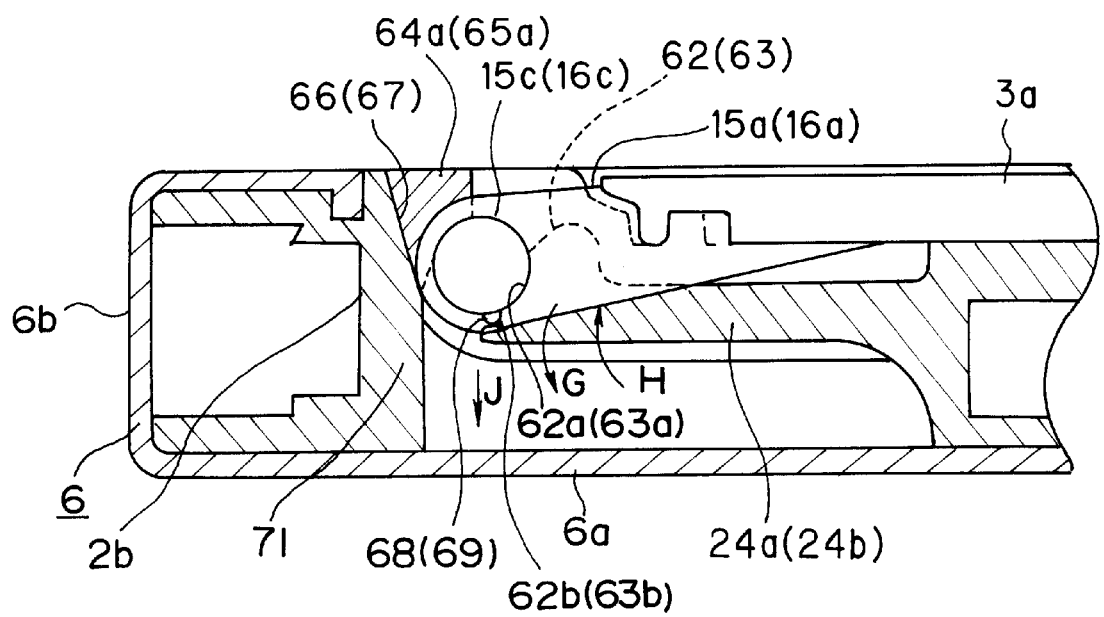
FIG. 11 is a cross-sectional view showing the state in which the cover member is being mounted on the casing main member.

Meanwhile, since the rotation-limiting lugs 68, 69 for limiting the rotation of the cover member 3 are provided on the cover member 3, as described above, the rotation-limiting lugs 68, 69 are engaged in the engagement recesses 62a, 63a formed in the distal ends of the shank supporting pieces 24a, 24b when the cover member 3 closes the disc housing section 4 of the casing main member 2, as shown in FIG. 11, thus limiting free rotation of the shank portions 15c, 16c to maintain the state of closure of the disc housing section 4 by the cover member 3.

When the cover member 3 closing the disc housing section 4 is to be opened, the rotation-limiting lugs 68, 69 are rotated, while thrusting the inner peripheral surfaces of the shank engagement recesses 62b, 63b, for elastically moving the shank supporting pieces 24a, 24b in a direction indicated by arrow G in FIGS. 10 and 11. When the cover member 3 is rotated a pre-set amount in the direction of opening the disc housing section 4, the sides of the protruding pieces 15a, 15b and 16a, 16b are abutted against the rotation amount controlling wall sections 66, 67 provided on the casing main member 2 to suppress further rotation of the cover member 3. At this time, the rotation-limiting lugs 68, 69 are disengaged from the shank engagement recesses 62a, 63a, 64a, 65a and moved to the upper ends of the retention projections 62, 63 to compress against the retention projections 62, 63. The shank supporting pieces 24a, 24b are elastically restored to thrust the peripheral surfaces of the shank portions 15c, 16c against the upstanding wall section 71.

Figure 12:
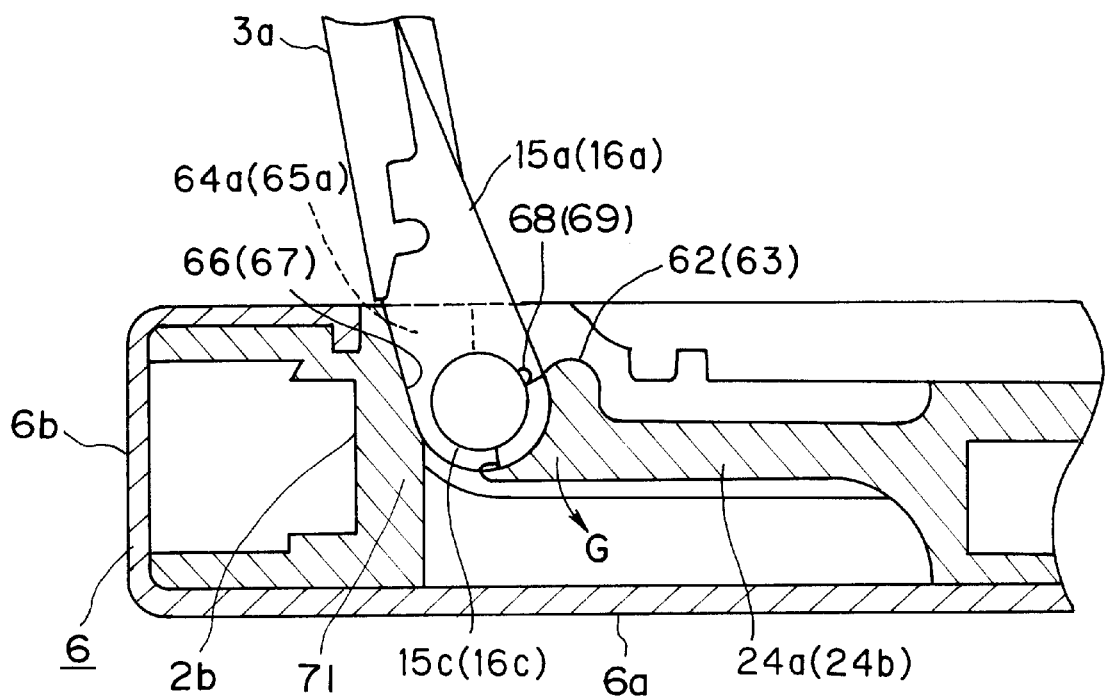
FIG. 12 is a cross-sectional view showing the state in which the cover member has been mounted on the casing main member.

When the cover member 3 has been rotated to a position of opening the disc housing section 4, the rotation-limiting lugs 68, 69 provided on the shank portions 15c, 16c are abutted against the upper end faces of the retention projections 62, 63 provided on the distal ends of the shank supporting pieces 24a, 24b. Thus, when the cover member 3 is to be rotated in the direction of closing the disc housing section 4, the shank supporting pieces 24a, 24b need to be elastically moved in the direction indicated by arrow G in FIG. 12. This limits rotation of the cover member 3 in the direction of closing the disc housing section 4 to maintain the disc housing section 4 in the opened position to facilitate the exchange operation of the optical disc 200 in the disc housing section 4.

Meanwhile, the cover member 3 is preferably kept in at least a 90°-opened position with respect to the casing main member 2, in view of operability in the exchange operation for the disc housing section 4 of the optical disc 200.

In the above-described embodiment, the shank portions 15c, 16c are provided on the cover member 3. Alternatively, the cover member 3 may be rotatably mounted on the casing main member 2 by providing the shank portions on the casing main member 2 and by fulcruming the mounting units 15, 16 provided on the cover member 3 on the shank portions.

Still alternatively, means for keeping the cover member 3 in the disc housing section opening position may be provided on a pair of protruded pieces or on the cover member 3.

On left and right sides of the back side 2b of the casing main member 2 are mounted a pair of opening/closure controlling members 26, 27 for controlling the opening movement of the cover member 3, as shown in FIG. 1. These opening/closure controlling members 26, 27 are mounted on the casing main member 2 so that the paired engagement pieces 21a, 21b of the cover member 3 are movable between a first position in which the paired engagement pieces 21a, 21b of the cover member 3 when engaged in the paired engagement grooves 20a, 20b are engaged in the engagement openings 21c, 21d formed in the engagement pieces 21a, 21b to limit the opening operation of the cover member 3 and a second position in which the engagement pieces 21a, 21b are disengaged from the engagement openings 21c, 21d so as to be protruded outwards from the left and right lateral sides of the casing main member 2 to enable the opening movement of the cover member 3. Since the first opening/closure controlling member 26 mounted on the left lateral side 2a of the casing main member 2 in FIG. 1 and the second opening/closure controlling member 27 mounted on the right lateral side 2b of the casing main member 2 in FIG. 1 are of the same structure, the first opening/closure controlling member 26 mounted on the left lateral side 2a is now explained as an example.

Figure 13:
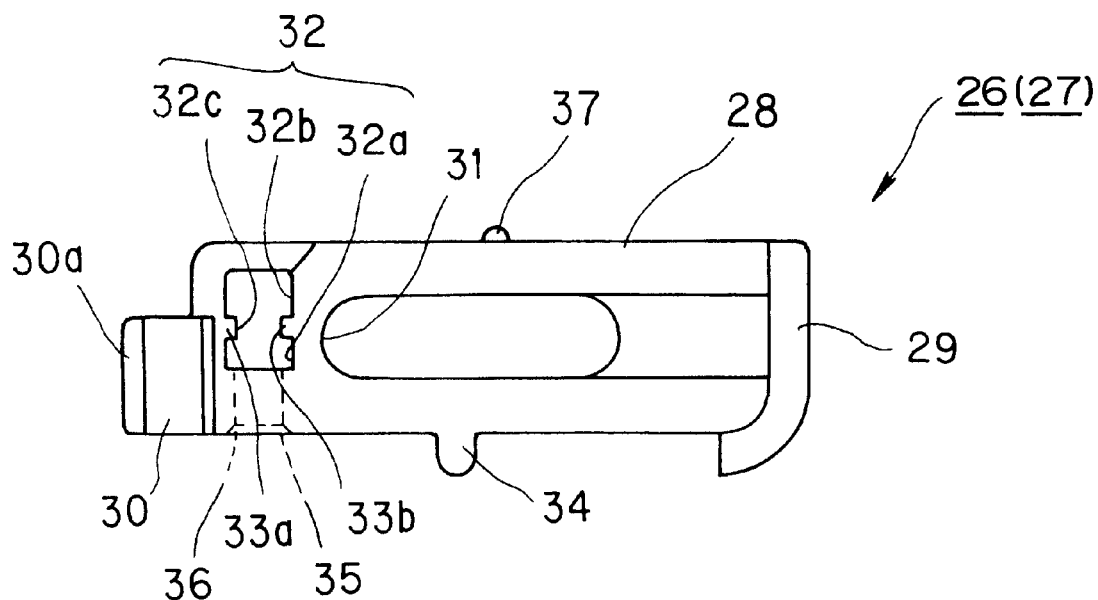
FIG. 13 is a plan view showing an opening/closure control member controlling the opening movement of the cover member mounted on the casing main member.
Figure 14:
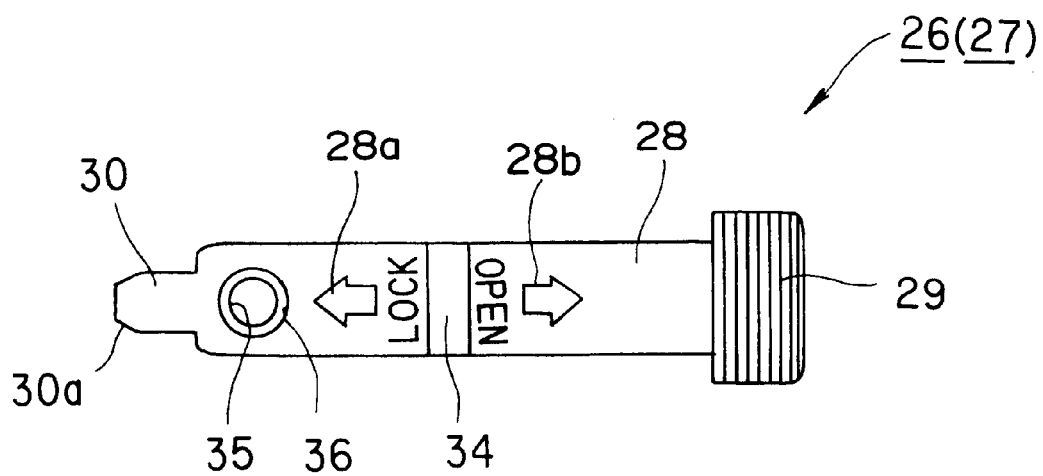
FIG. 14 is a side view of the opening/closure control member shown in FIG. 13.

The opening/closure controlling member 26 is formed of a synthetic resin material and includes a substantially rectangular main body portion 28, a thrusting actuating portion 29 and an engagement projection 30, as shown in FIGS. 13 and 14. The thrusting actuating portion 29 is provided on a longitudinal end of the main body portion 28 for moving the opening/closure controlling member 26 from the second position to the first position. The engagement projection 30 is provided on the opposite a longitudinal end of the main body portion 28 for being engaged in the engagement openings 21c, 21d of the engagement pieces 21a, 21b when the opening/closure controlling member 26 is moved to the first position.

At a mid portion of the main body portion 28 of the opening/closure controlling member 26 is formed an elliptically-shaped opening 31, having its long axis along the longitudinal direction of the main body portion 28, for extending along the thickness of the main body portion 28. The main body portion 28 having this elongated opening 31 is elastically deformable along its short side. Towards the engagement projections 30 of the elongated opening 31 of the main body portion 28 is formed a pin retention opening 32 retained by the distal end of a movement limiting pin inserted parallel to the major surface of the main body portion 28 from the lateral side of the main body portion 28. The movement limiting pin will be explained in detail subsequently. The pin retention opening 32 is made up of a first opening 32a and a second opening 32b interconnected via a connecting hole portion 32c, as shown in FIG. 13. The connecting hole portion 32c is narrower in width than the first opening 32a and the second opening 32b. That is, at a mid portion of the pin retention opening 32 are formed a pair of facing pin retention projections 33a, 33b for forming the connecting hole portion 32c of the narrower width. Thus, the connecting hole portion 32c has a substantially H-shaped cross-sectional shape, as shown in FIG. 13.

On one longitudinal side of the main body portion 28 of the opening/closure controlling member 26 is formed an actuating protrusion 34 extending along the thickness of the main body portion 28. This actuating protrusion 34 is used for moving the opening/closure controlling member 26 from the first position to the second position. On the left and right sides on both sides of the actuating protrusion 34 are scored or printed letters or arrows constituting indicators 28a, 28b for indicating the opening/closing direction of the opening/closure controlling member 26, as shown in FIG. 14. The letters indicating the opening/closing direction of the opening/closure controlling member 26 are formed for extending along the thickness of the main body portion 28, with the actuating protrusion 34 directed downwards. By providing these letters, the opening/closure controlling member 26 may be used with its upper and lower sides in the topsy-turvy position, such that the letters can be easily deciphered if the opening/closure controlling member 26 is the opening/closure controlling member 26 mounted on the lateral side 2a towards the back side 2b of the casing main member 2 or is the opening/closure controlling member 27 mounted on the opposite lateral side 2b of the casing main member 2.

In the longitudinal lateral side of the opening/closure controlling member 26 is formed a pin inserting opening 35 passed through by a movement limiting pin member. The pin inserting opening 35 has a diameter substantially equal to the diameter of the movement limiting pin member and is formed in the upper and lower sides of the main body portion 28 in parallel for communication at its distal end with the above-mentioned pin retention opening 32. At the opening area of the pin inserting opening 35 in the lateral side along the long side of the main body portion 28 is formed an inclined guide surface 36 for guiding the insertion in the pin inserting opening 35 of the movement limiting pin member around the opening end of the pin inserting opening 35. On the other longitudinal side along the long side direction of the main body portion 28 is formed a positioning projection 37 engaged in a positioning engagement groove formed in the casing main member 2 for positioning the opening/closure controlling member 26, when the opening/closure controlling member 26 is moved to the first or second position, as shown in FIG. 14.

On the longitudinal end of the main body portion 28 of the opening/closure controlling member 26 is formed the thrusting portion 29 for moving the opening/closure controlling member 26 from the second position to the first position, as explained previously. The thrusting portion 29 has a thickness larger than the thickness of the main body portion 28 and is formed in substantially an L-shape for extending from a lateral side along the short side of the main body portion 28 to the opposite side lateral surface along the long side of the main body portion 28, as shown in FIG. 13. With the thrusting portion 29, the portion projected from the upper and lower surfaces of the main body portion 28 and end of the portion provided on the opposite lateral side along the long side of the main body portion 28 serve as abutment surfaces extending perpendicular to the movement direction of the opening/closure controlling member 26, such that, when the opening/closure controlling member 26 is moved to the first position, the abutment surface is abutted against a groove formed in the lateral sides 2c, 2d of the casing main member 2 to facilitate further movement of the opening/closure controlling member 26. The thrusting portion 29 has a roughed surface for slip-proofing for assuring facilitated thrusting actuation of the opening/closure controlling member 26.

On the longitudinal opposite end of the main body portion 28 of the opening/closure controlling member 26, there is provided the engagement projection 30 inserted and engaged in the engagement openings 21c, 21d formed in the engagement pieces 21a, 21b provided on the distal end of the cover member 3. The distal end of the engagement projections 30 is formed with an inclined surface 30a reduced in diameter towards its distal end for assuring facilitated insertion of the engagement projections 30 into the engagement openings 21c, 21d of the engagement pieces 21a, 21b.

Figure 15:
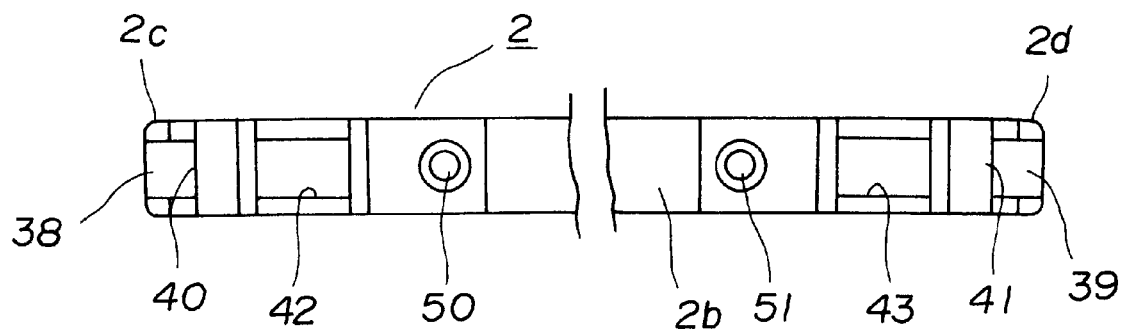
FIG. 15 is a back side view of the back surface of the casing main member.

On the left and right lateral sides 2c, 2d on the back side 2b of the casing main member 2 are formed first and second containers 38, 39 for movably accommodating the first and second opening/closure controlling members 26 and 27, as shown in FIG. 15. These first and second containers 38, 39 are provided with openings 40, 41 opening in the lateral sides 2c, 2d of the casing main member 2, respectively. The perimeter of the openings 40, 41 are cut out in meeting with the thrusting portion 29 of the first and second opening/closure controlling members 26 and 27 so that, when the first and second opening/closure controlling members 26 and 27 is moved to the first position, the thrusting portion 29 will be accommodated in the cut-out portion.

The first and second containers 38, 39 are bored to a shape corresponding to the main body portion 28 and the engagement projection 30 of the first and second opening/closure controlling members 26 and 27 in a direction perpendicular to the inserting direction of the container casing 1 into the disc drive device and are opened on the opposite side major surface of the casing main member 2. These first and second containers 38, 39 are closed by a back plate provided on the major surface of the casing main member 2, as will be explained subsequently. The containers 38, 39 are provided on the back side 2b of the casing main member 2 with operating openings 42, 43 for exposing the actuating protrusion 34 of the first and second opening/closure controlling members 26 and 27 to outside of the casing main member 2 to permit movement of the opening/closure controlling members 26 and 27 when the opening/closure controlling members 26 and 27 are accommodated therein. Around the operating openings 42, 43 is formed an inclined surface inclined towards the opening edge to assure facilitated operation of the actuating protrusion 34.

On the inner wall surfaces of the first and second containers 38, 38 facing the operating openings 42, 43 are formed grooves, not shown, engaged with the positioning projections 37 of the opening/closure controlling members 26, 27 for positioning the opening/closure controlling members 26, 27 when the opening/closure controlling members 26, 27 are moved to the first position, and grooves, not shown, engaged with the positioning projections 37 of the opening/closure controlling members 26, 27 for positioning the opening/closure controlling members 26, 27 when the opening/closure controlling members 26, 27 are moved to the second position.

When the first and second opening/closure controlling members 26, 27 are accommodated in the first and second containers 38, 39, respectively, the first and second opening/closure controlling members 26, 27 are inserted via the openings 40, 41 opening in the lateral sides 2c, 2d into the first and second containers 38, 39, with the actuating protrusions 34 as the inserting ends, respectively. Since the main body portion 28 of each of the first and second opening/closure controlling members 26, 27 is formed with the elongated opening 31, as described above, the main body portion 28 is elastically deformed and contracted in diameter in a direction perpendicular to the inserting direction. When the actuating protrusion 34 is passed through the area surrounded by the wall surface sections of the first and second containers 38, 39 and protruded from the operating openings 42, 43, the main body portion 28 is elastically deformed and contracted in diameter so that the actuating protrusion 34 is held within the operating openings 42, 43 to prevent the first and second opening/closure controlling members 26, 27.

With the container casing 1 for the disc according to the present invention, the first and second opening/closure controlling members 26, 27 are mounted on the casing main member 2 and engaged with the cover member 3 to control the opening/closure movement of the cover member 3, the opening movement of the cover member 3 is limited reliably. In particular, with the container casing 1 of the present invention, since the opening operation for the cover member 3 is produced when the first and second opening/closure controlling members 26, 27 are moved to the second position of being protruded outwards from the lateral sides 2c, 2d of the casing main member 2, there is no risk of the cover member 3 being opened by impact such as by decent to injure the disc held in the disc housing section 4.

Also, with the container casing 1 of the present invention, the first and second opening/closure controlling members 26, 27 are moved to the second position, that is to the position protruded from the left and right lateral sides 2c, 2d of the casing main member 2, when the cover member 3 is opened, the container casing 1 becomes larger in width than the disc loading opening provided in the disc drive device, in the opened state of the cover member 3, so that there is no risk of the container casing 1 being incorrectly introduced into the disc drive device in the opened state of the cover member 3.

When the first and second opening/closure controlling members 26, 27 are moved to the second position, the overall width of the container casing 1 is preferably larger than the length in the inserting direction of the container casing 1 into the disc drive device. For preventing the insertion of the container casing 1 from the incorrect direction, the width of the disc loading/unloading opening is usually smaller than the width of the container casing 1 in the inserting direction. Thus, with the container casing 1, the first and second opening/closure controlling members 26, 27 are moved to the second position and the overall width of the container casing 1 is larger than the length of the container casing 1 in the inserting direction into the disc drive device, it is possible to prevent the cover member 3 from being incorrectly introduced into the disc drive device in the opened state oft the cover member 3.

The first and second opening/closure controlling members 26, 27 may also be mounted on the cover member 3. In this case, the first and second opening/closure controlling members 26, 27 are engaged with the casing main member 2 to control the opening operation of the cover member 3.

After the first and second opening/closure controlling members 26, 27 are mounted on the casing main member 2, it is desirable to prevent excess movement of the main body portion 28 in consideration of the operability of the first and second opening/closure controlling members 26, 27 and the risk of descent. Thus, a pair of shank portions provided on the shutter supporting plate 9 mounted on the casing main member 2 are inserted into the elongated openings 31 of the first and second opening/closure controlling members 26, 27 mounted on the casing main member 2 to prevent excess movement of the main body portion 28.

The shutter supporting plate 9, mounted on the other major surface of the casing main member 2, supports the movement guide piece 6d formed on one end of the shutter portion 6a of the shutter member 6 to prevent the one end of the shutter portion 6a of the shutter member 6 from rotating in a direction away from the casing main member 2, while guiding movement of the shutter member 6 along the other major surface of the casing main member 2.

Figure 16:
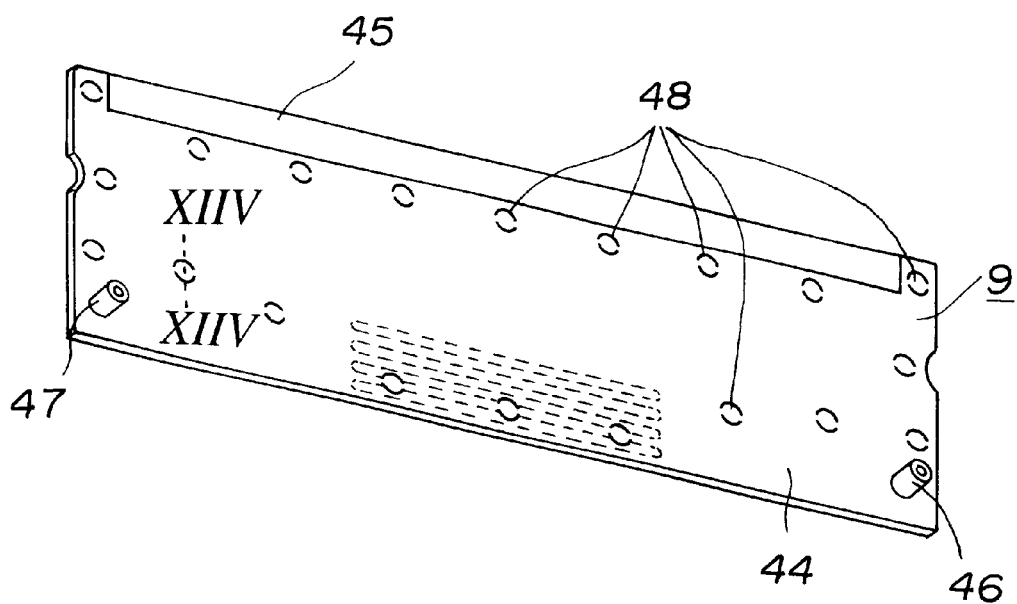
FIG. 16 is a perspective view showing a shutter supporting plate mounted on the casing main member.

The shutter supporting plate 9 is mounted on the opposite major surface of the casing main member 2 to support the movement guide piece 6d formed on one end of the shutter portion 6a of the shutter member 6, while closing the opening of the containers 38, 39 opened on the opposite major surface of the casing main member 2. The shutter supporting plate 9 is formed of a synthetic resin material in the form of an elongated plate, as shown in FIG. 16. On one longitudinal side of the shutter supporting plate 9 is formed a recess 45 to a length corresponding to the movement range of the shutter member 6 along the long side of the shutter supporting plate 9. Into the recess 45 is inserted the movement guide piece 6d when the shutter supporting plate 9 is mounted on the casing main member 2. When the shutter supporting plate 9 is mounted on the opposite major surface of the casing main member 2, the shutter member 6 has the movement guide piece 6d inserted into the gap between the recess 45 of the shutter supporting plate 9 and the opposite major surface of the shutter supporting plate 9 to prevent the one end of the shutter portion 6a from rotating in a direction away from the casing main member 2.

On the other opposite side of the shutter supporting plate 9 are formed a pair of shank portions 46, 47 inserted into the elongated openings 31 of the first and second opening/closure controlling members 26, 27 to prevent excess movement of the first and second opening/closure controlling members 26, 27 when the shutter supporting plate 9 is mounted on the casing main member 2.

Figure 17:
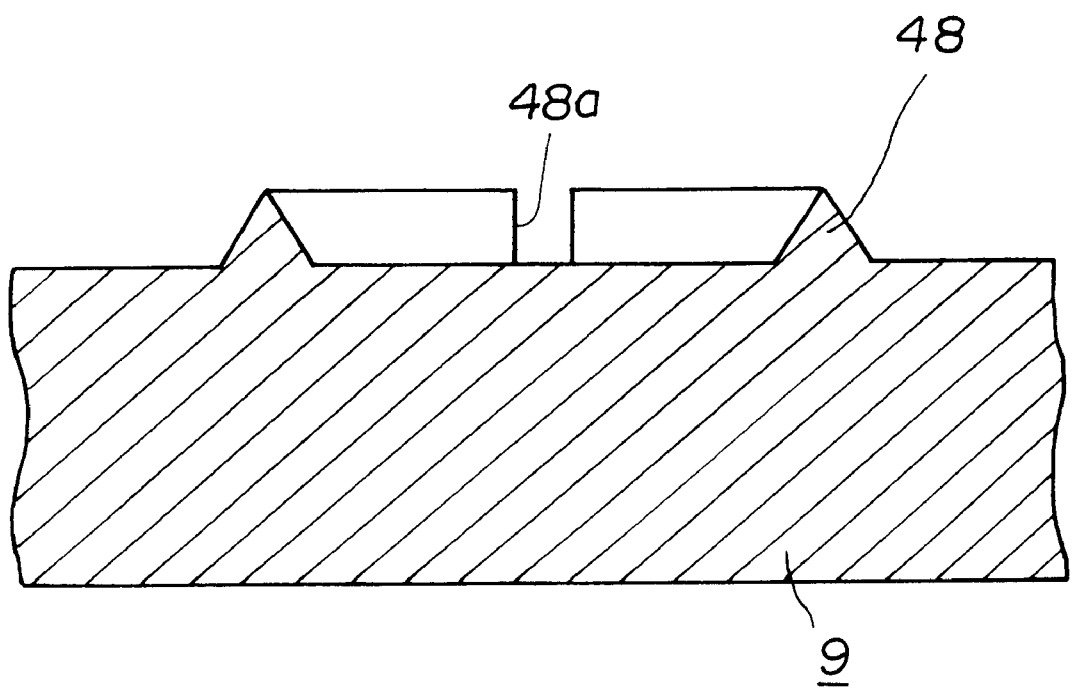
FIG. 17 is a cross-sectional view showing a protrusion for welding on the shutter supporting plate.

On the back surface of the shutter supporting plate 9 facing the opposite major surface of the casing main member 2 on mounting the shutter supporting plate 9 on the casing main member 2, there are formed plural weld projections 48 for ultrasonic welding of the shutter supporting plate 9 to the casing main member 2. Each weld projections 48 is formed as a substantially annular projection protruded from the back surface o the shutter supporting plate 9, as shown in FIG. 17. This weld projection 48 is triangular in cross-section and is adapted for having substantially line contact with the casing main member 2. The contact point of the weld projection 48 with the casing main member 2 serves as weld point. At least the distal end of the weld projection 48 is formed with a cut-out 48a. FIG. 17 is a cross-sectional view taken along line XVII—XVII of FIG. 16.

Figure 19:
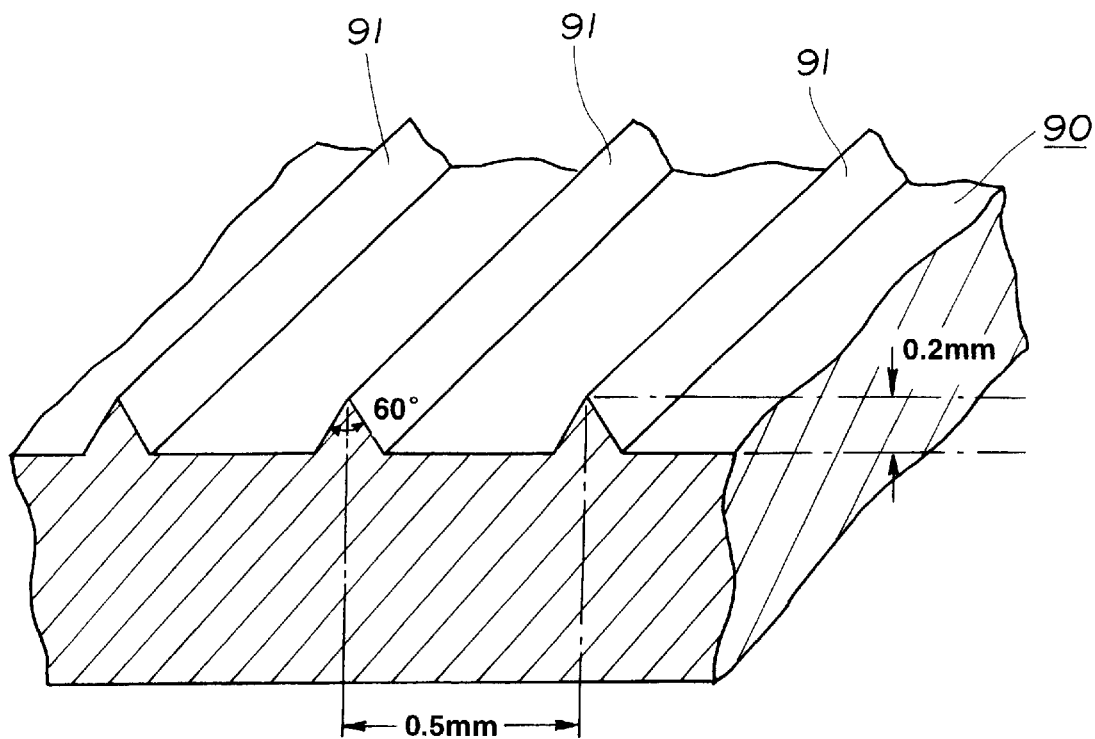
FIG. 19 is a partial perspective view showing a weld provided on the casing main member.

On the opposite major surface of the casing main member 2 are formed plural welds 90 which are provided on the opposite major surface of the casing main member 2 in register with the weld projections 48 of the shutter supporting plate 9. The surface of each weld 90 is a roughed surface having micro-sized protuberances. Specifically, the weld 90 has a roughed surface by having plural ribs 91 of substantially triangular cross-section having a projecting height of approximately 0.2 mm and an apex angle of approximately 60°, as shown in FIG. 19. The shape and the size of the rib 91 are merely illustrative and may be suitably modified to suit to the size and shape of the weld projections 48 welded to the welds 90.

The shutter supporting plate 9 is mounted on the opposite side major surface of the casing main member 2 by ultrasonic welding with the weld projections 48 compressing against the welds 90 of the casing main member 2. In the ultrasonic welding of the shutter supporting plate 9 to the casing main member 2, the weld projections 48 of the shutter supporting plate 9 are abutted against the welds of the casing main member 2 and longitudinal vibrations with the frequency of 20 to 40 kHz and the amplitude of 50 to 60 $\mu$m are applied to the welds to fuse the contacting portions by frictional heat to effect welding. The smaller the area of the contacting portions, the lower the vibration energy required in welding and the more efficiently the vibration energy is transmitted to the weld portions.

With the container casing 1 of the present invention, the weld projections 48 of the shutter supporting plate 9 having cut-out distal ends are abutted against the welds 90 of the casing main member 2 having the roughed surface to effect ultrasonic welding to attach the shutter supporting plate 9 to the casing main member 2, so that welding may be achieved with a smaller vibration energy to prevent the use of an excess vibration energy which might lead to defects such as crevices in the shutter supporting plate 9 or in the casing main member 2.

Also, with the container casing 1 of the present invention, a large number of the weld projections 48 are provided in an extensive range of the shutter supporting plate 9 and the welds 90 are provided in register with the weld projections 48, these welds 48, 90 being abutted together to effect ultrasonic welding to secure the flat-plate-shaped shutter supporting plate 9 reliably to the casing main member 2 by ultrasonic welding.

When mounting the shutter supporting plate 9 on the casing main member 2, the distal ends of the shank portions 46, 47, inserted into the elongated openings 31 of the first and second opening/closure controlling members 26, 27, also are desirably welded to the casing main member 2. By welding the distal ends of the shank portions 46, 47, the shutter supporting plate 9 is intensified further in its mounting state.

Figure 20:
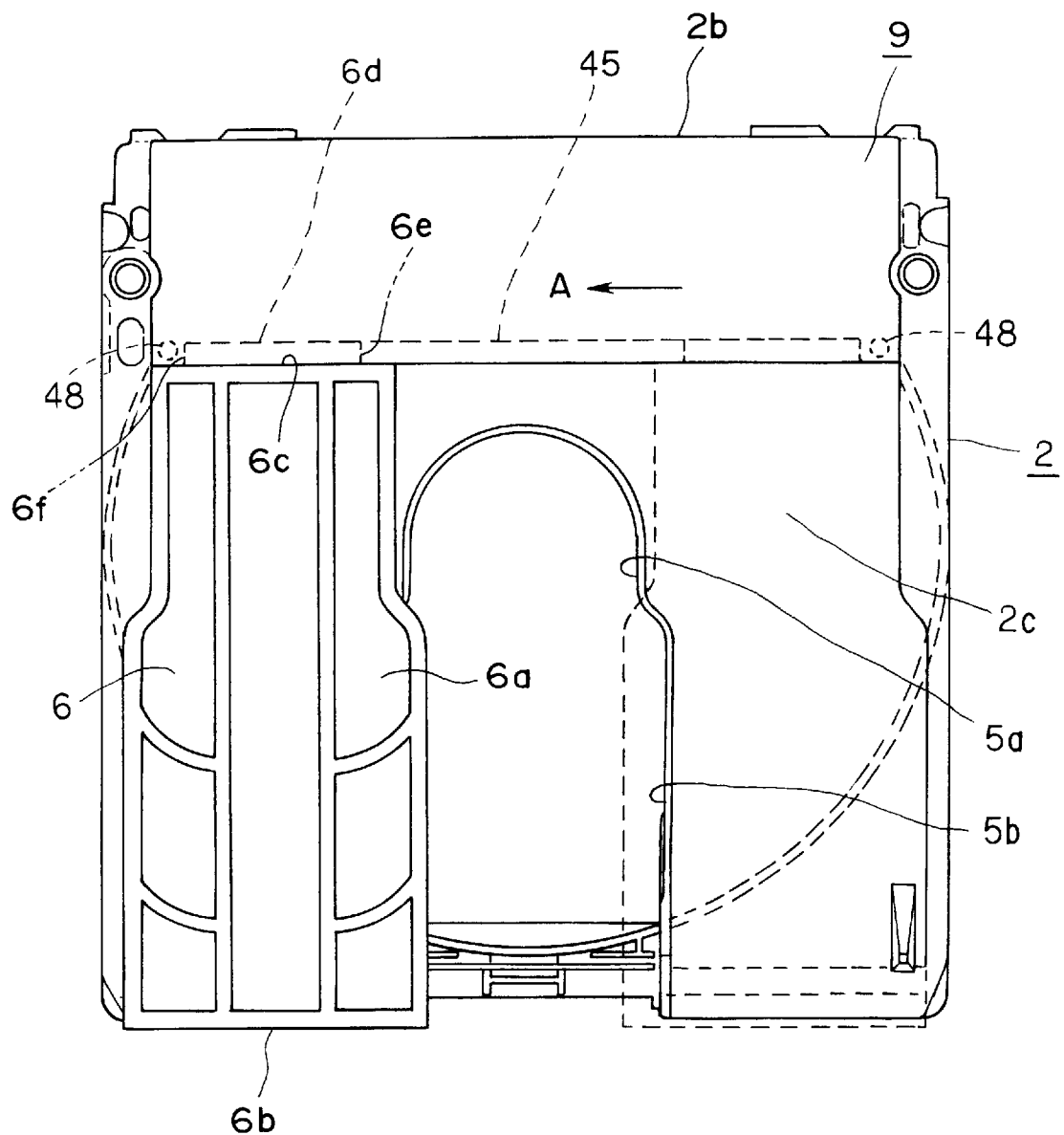
FIG. 20 is bottom view of the disc container casing showing the state in which the shutter member mounted on the casing main member has been moved to a position opening the recording and/or reproducing aperture and the center opening.

Meanwhile, since the cut-outs 6e, 6f are formed on both sides along the movement direction of the movement guide piece 6d of the shutter member 6 inserted into the gap between the recess 45 provided on one longitudinal side of the shutter supporting plate 9 and the surface of the casing main member 2, as shown in FIG. 2, the weld point can be provided at a position facing the cut-out 6f when the shutter member 6 is moved in the direction indicated by arrow A in FIG. 20 for opening the openings 5a, 5b formed in the casing main member 2. By providing the weld point in this position, the shutter supporting plate 9 can be mounted more positively on the casing main member 2. The position of the shutter supporting plate 9 faced by the cut-out 6f when the shutter member 6 has been moved to the position of opening the openings 5a, 5b in the casing main member 2 is in register with the lateral edge towards the recess 45 of the shutter supporting plate 9, the shutter supporting plate 9 having the weld point can be mounted more reliably on the casing main member 2. Moreover, the shutter member 6 can be moved in a direction away from the casing main member 2 more reliably, while the shutter member 6 can be moved in stability.

For welding the shutter supporting plate 9 to the casing main member 2, weld projections and welds may be provided on the casing main member 2 and the shutter supporting plate 9, respectively, and abutted to each other in order to effect ultrasonic welding. The opposite side major surface of the casing main member 2 may be roughed in its entirety or substantially in its entirety to serve as the welding surface.

Figure 18:
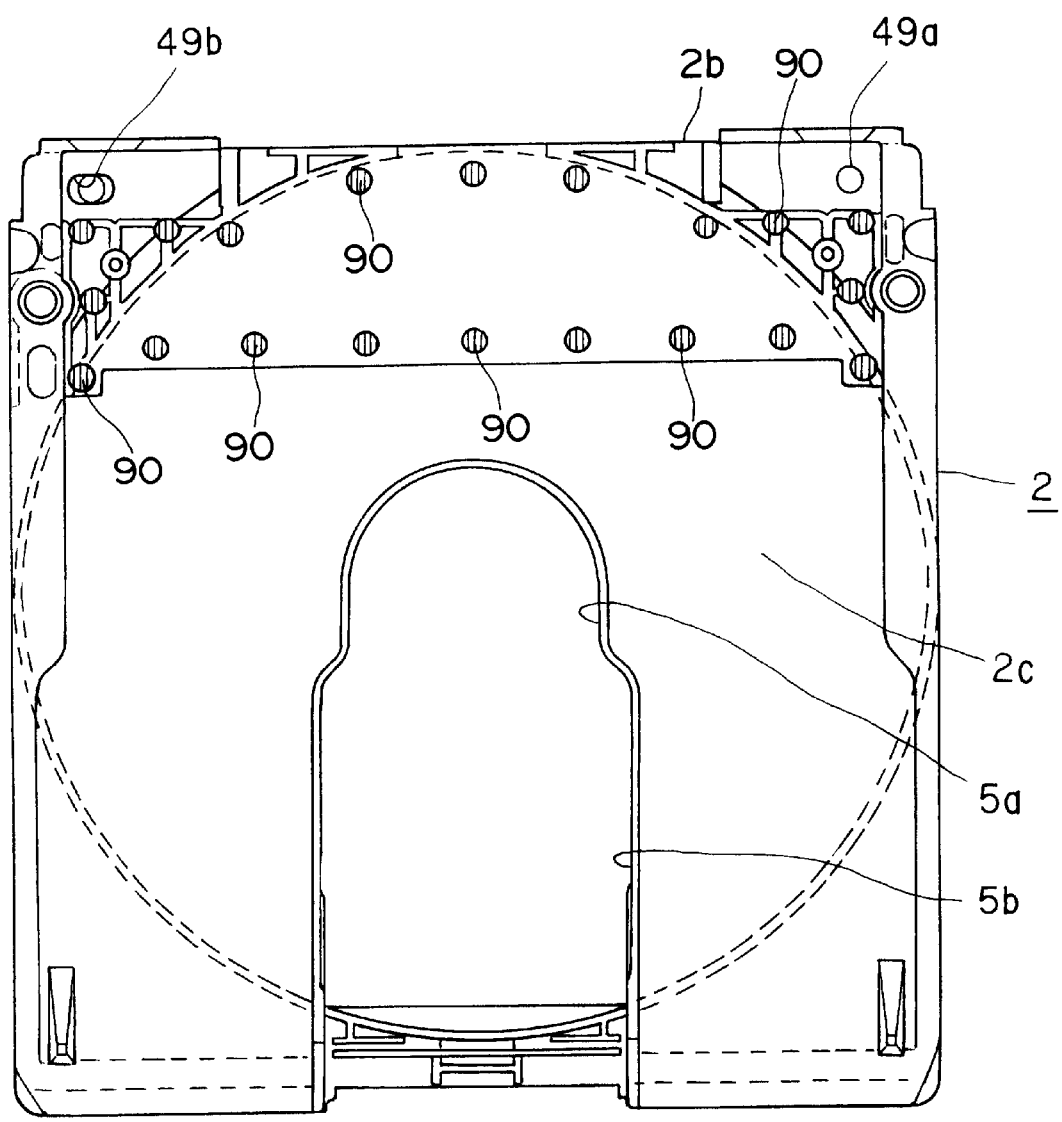
FIG. 18 is a bottom view showing a shutter supporting plate mounting portion of the casing main member.

Referring to FIG. 18, a pair of fitting recesses 49a, 49b in which are fitted the shank portions 46, 47 of the shutter supporting plate 9, respectively, are formed on left and right sides of the back side 2b of the casing main member 2. The shank portions 46, 47 of the shutter supporting plate 9 have distal ends fitted in these fitting recesses 49a, 49b, respectively, via the elongated openings 31 provided in the main body portions 28 of the first and second opening/ closure controlling members 26, 27. These fitting recesses 49a, 49b are designed for positioning the shutter supporting plate 9 when mounting the shutter supporting plate 9 on the casing main member 2. One 49a of the fitting recesses is substantially of the same diameter as the shank portion 46 to permit tight fitting. The opposite side fitting recess 49b has a diameter slightly larger than the outer diameter of the opposite shank portion 47 of the shutter supporting plate 9 in order to absorb relative position shift between the shank portions 46, 47 caused by tolerance in molding the shutter supporting plate 9. In particular, the opposite side recess 49b has its long axis extending along the direction perpendicular to the direction of insertion of the container casing 1 into the disc drive device to absorb variance in the gap length between the shank portions 46, 47 of the shutter supporting plate 9.

On the back side 2b of the casing main member 2 are formed first and second control pin inserting openings 50, 51 into which are inserted movement control pins 52 controlling the movement of the first and second opening/closure controlling members 26, 27 to control the opening of the cover member 3, as shown in FIG. 15. The inner peripheral surfaces on the opening ends of these control pin inserting openings 50, 51 are preferably formed with inclined surfaces to assure facilitated insertion of the movement control pins into the control pin inserting openings 50, 51.

Figure 21:
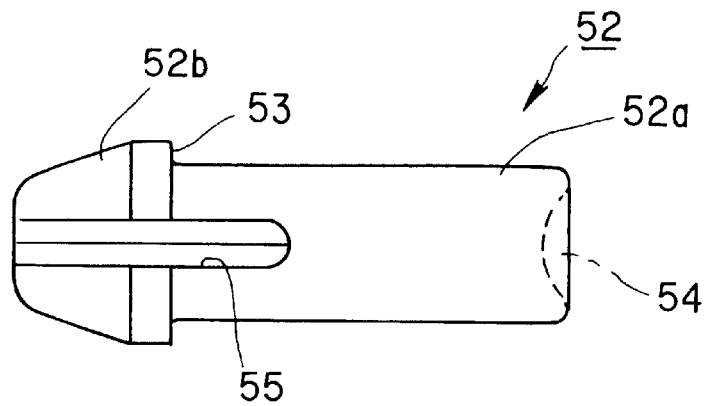
FIG. 21 is a side view showing a movement control pin mounted on the casing main member.
Figure 22:
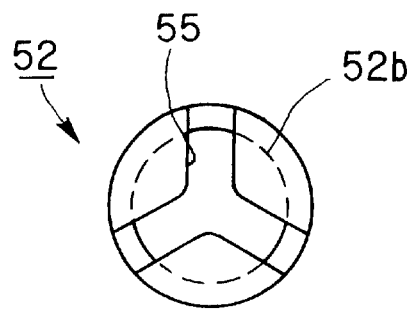
FIG. 22 is a front view of a movement control pin.

The movement control pin 52, inserted into each of the first and second control pin inserting openings 50, 51, has a columnar-shaped shank 52a and a substantially conically-shaped retainer 52b, larger in diameter than the shank 52a, formed at the distal end of the shank 52a, as shown in FIGS. 21 and 22. The step difference formed between the shank 52a and the retainer 52b serves as a control portion 53 retained by the paired pin retention projections 33a, 33b provided on the first and second opening/closure controlling members 26, 27 to control extraction of the movement control pin 52. The proximal end of the shank 52a is recessed to form a finger support 54 to facilitate insertion of the movement control pin 52. The movement control pin 52 has slits 55 extending from the retainer 52b towards the distal end of the shank 52a along the movement direction of the movement control pin 52. These slits 55 are substantially Y-shaped in cross-section to split the distal end side in the movement direction of the movement control pin 52 into three equal portions. The movement control pin 52, provided with these slits 55, can be elastically deformed so as to be contracted in diameter towards the center axis.

Figure 23:
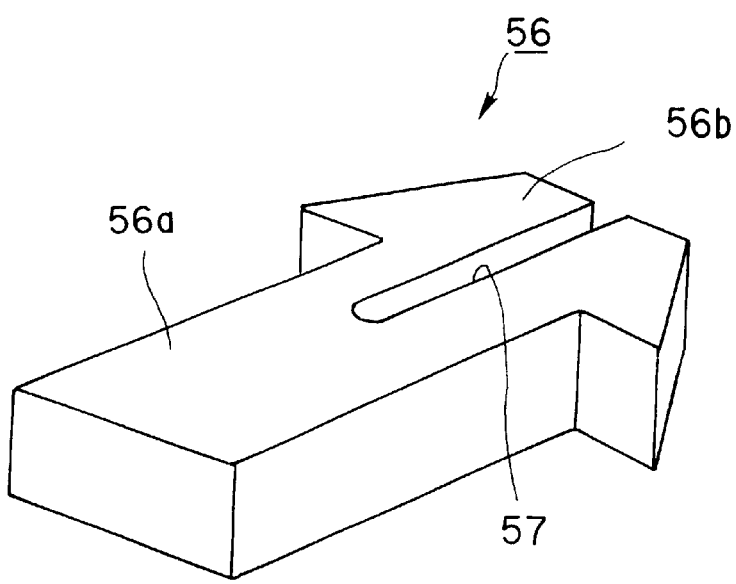
FIG. 23 is a perspective view showing another embodiment of the movement control pin.

Although the movement control pin 52 of the present embodiment has the columnar-shaped shank 52a and the substantially conically-shaped retainer 52b, the movement control pin used in the container casing 1 of the present invention is not limited to this embodiment since it may also be a movement control pin 56 having a prismatically-shaped shank 56a carrying a retainer 56b at its distal end, as shown in FIG. 23. In such case, the movement control pin 56 is again provided with slits 67 extending along its axis and may be elastically deformed in a direction perpendicular to the movement direction.

The movement control pin 52 used in the container casing 1 according to the present invention may be formed with a bore extending along the movement direction to form a spacing therein extending from the distal end towards the proximal end of the retainer 56b so that the movement control pin 52 can be elastically deformed in a direction perpendicular to the movement direction.

Figure 24:
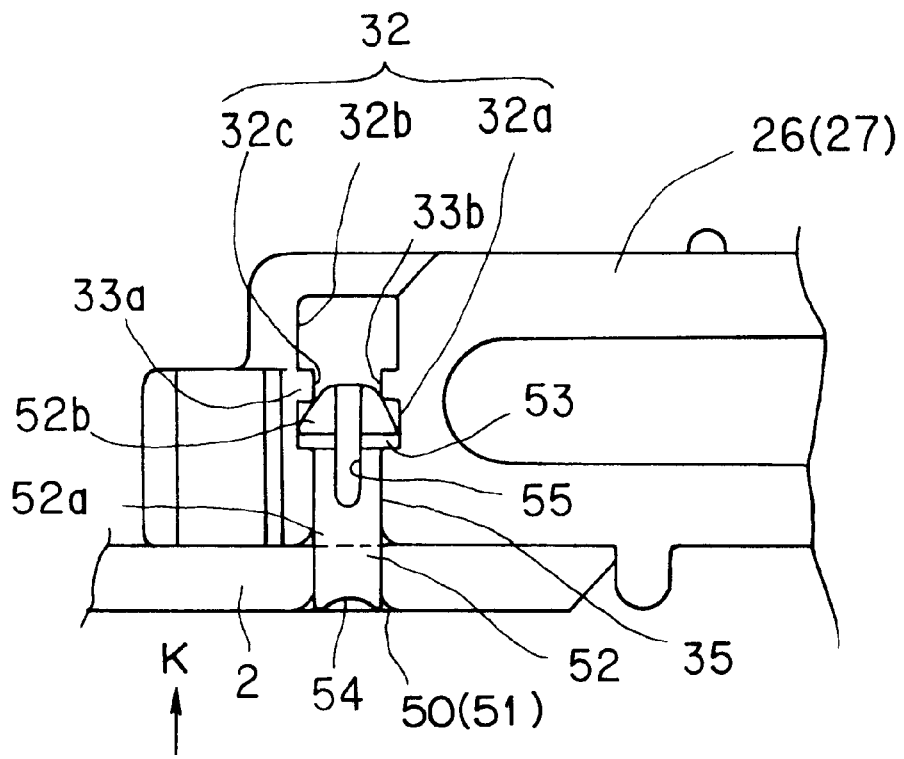
FIG. 24 is a side view showing the state in which the movement control pin is being pushed into the movement member.
Figure 25:
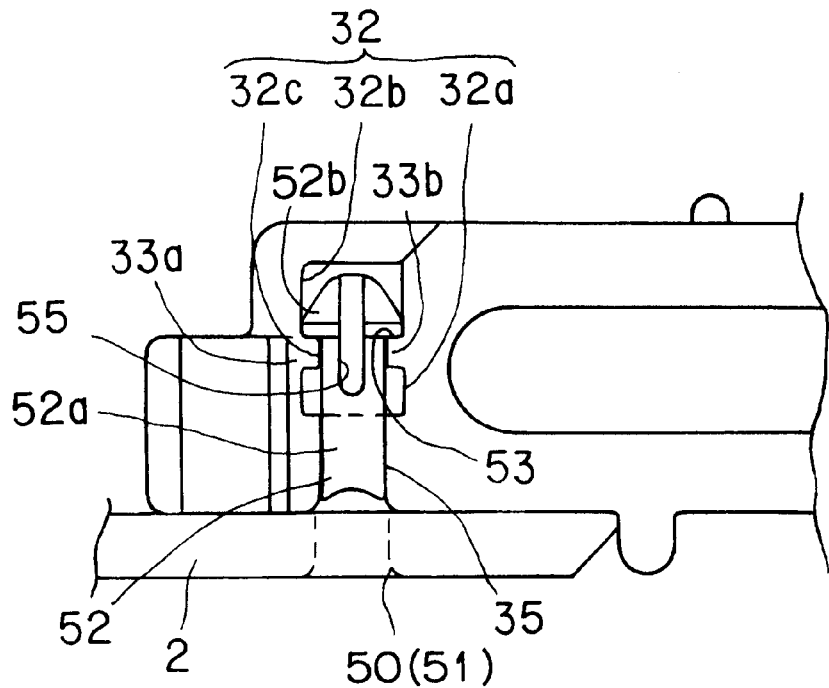
FIG. 25 is a side view showing the state in which the movement control pin has been pushed into the movement member.

In the initial state, the movement control pin 52 is inserted from the control pin inserting openings 50, 51 formed in the back side 2b of the casing main member 2 to the pin inserting opening 35 formed in the first and second opening/ closure controlling members 26, 27, as shown in FIG. 24. At this time, the first and second opening/closure controlling members 26, 27 are coupled to the casing main member 2 via the movement control pin 52 to restrict the movement of the first and second opening/closure controlling members 26, 27. When the movement control pin 52 is thrust from the casing main member 2 towards the first and second opening/ closure controlling members 26, 27 in the direction indicated by arrow K in FIG. 24, the retainer 52b is elastically deformed in a contracting direction, by the operation of the slits 55 formed for extending along the movement direction as indicated by arrow K in FIG. 24, until the movement control pin 52 is passed through the connecting hole portion 32c of the pin retention opening 32 into engagement with the second opening 32b, as shown in FIG. 25. When moved in the direction indicated by arrow K in FIG. 24, the movement control pin 52 is completely accommodated within the first and second opening/closure controlling members 26, 27 to disengage the first and second opening/closure controlling members 26, 27 to enable movement of the opening/closure controlling members 26, 27.

The movement control pin 52 is thrust from the casing main member 2 towards the first and second opening/closure controlling members 26, 27 until the retainer 52b is accommodated within the second opening 32b of the pin retention opening 32. This elastically restores the retainer 52b to enlarge its diameter so that the retention pawl 53 at the proximal end f the retainer 52b is retained by pin retention projections 33a, 33b provided between the first opening 32a and the second opening 32b of the pin retention opening 32 to disable restoration of the movement control pin 52 to the initial position.

Figure 26:
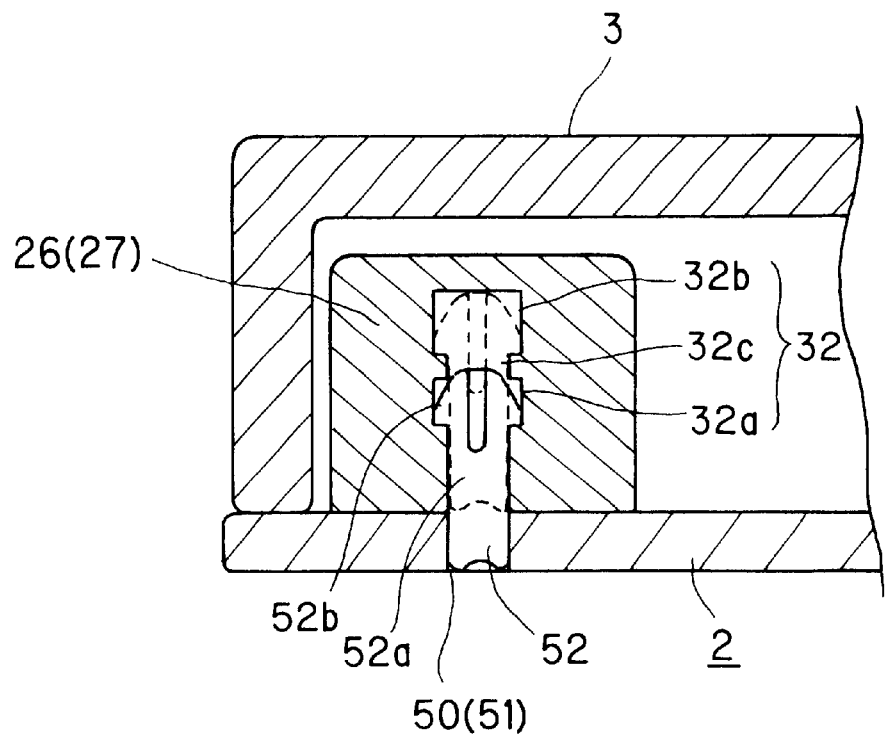
FIG. 26 is a cross-sectional view showing essential portions of the disc container casing for illustrating a further embodiment of the movement control pin provided on the disc container casing according to the present invention.

In the above embodiment, the control pin inserting openings 50, 51 are provided in the back side 2b of the casing main member 2 and the movement control pin 52 is inserted from the back side 2b as far as the first and second opening/closure controlling members 26, 27. Alternatively, control pin inserting openings 50, 51 may also be provided for extending from the opposite major surface of the casing main member 2 along the thickness of the casing main member 2 so that the movement control pin 52 is inserted from the opposite major surface of the casing main member 2 as far as the first and second opening/closure controlling members 26, 27, as shown in FIG. 26. By providing the control pin inserting openings 50, 51 in the opposite major surface of the casing main member 2 and by inserting the movement control pin 52 from the opposite major surface side, it can be easily detected by a detection unit provided on the disc drive device whether or not the movement control pin 52 has been thrust at the time of loading of the container casing 1 on the disc drive device. That is, it suffices if the detection unit on the disc drive device is provided on the loading surface of the container casing 1. It can be easily detected at the time of movement of the container casing 1 onto the loading surface whether or not the movement control pin 52 has been thrust. Moreover, the detection unit can be mounted easily.

Figure 27:
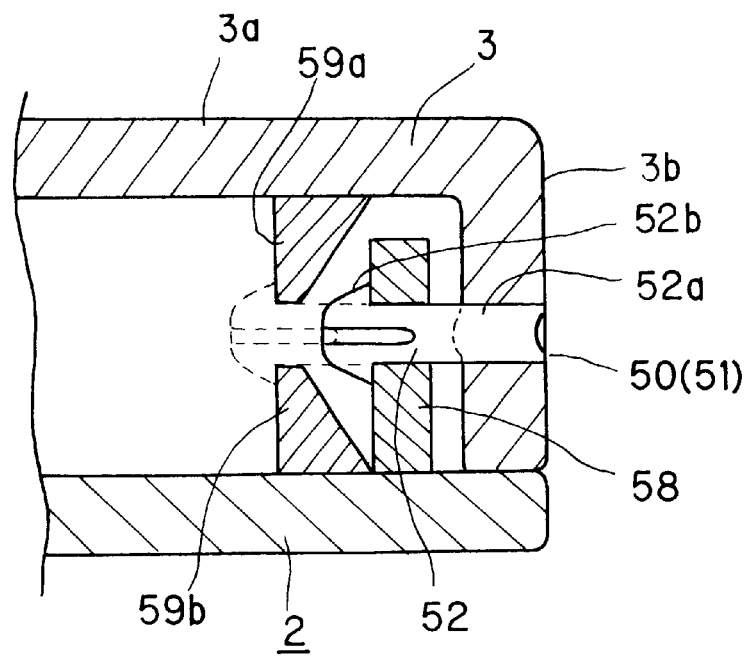
FIG. 27 is a cross-sectional view showing essential portions of the disc container casing for illustrating a still further embodiment of the movement control pin provided on the disc container casing according to the present invention.

In the above embodiment, the movement control pin 52 is inserted from the casing main member 2 as far as the first and second opening/closure controlling members 26, 27, and the movement of the first and second opening/closure controlling members 26, 27 is controlled to control the opening of the cover member 3. Alternatively, the casing main member 2 may be provided with an upstanding wall section 71 facing the protrusion 3b provided on the distal end of the cover member 3 and the movement control pin 52 may be inserted for extending between the protrusion 3b of the cover member 3 and the upstanding wall section 58 of the casing main member 2 for directly controlling the opening movement of the cover member 3, as shown in FIG. 27. In the present embodiment, retention projections 59a, 59b for retaining the retainer 52b of the movement control pin 52 is preferably provided between the major surface of the casing main member 2 and the facing surface of the main cover member 3a of the cover member 3, so that, on movement of the movement control pin 52, the retainer 52b is retained by the retention projections 59a, 59b.

The operation of opening the cover member 3 of the container casing 1 is hereinafter explained.

Figure 28:
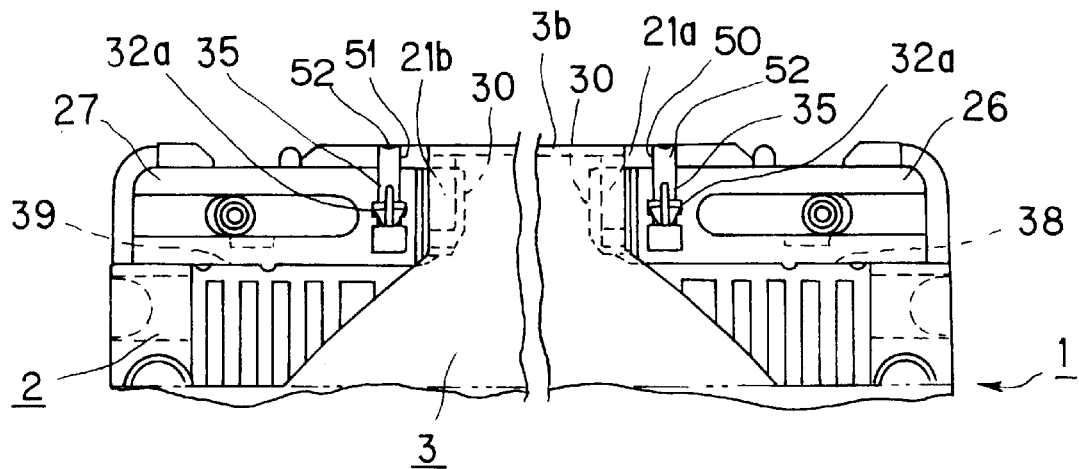
FIG. 28 is a plan view showing the controlled state of the opening operation of the cover member mounted on the casing main member.
Figure 29:
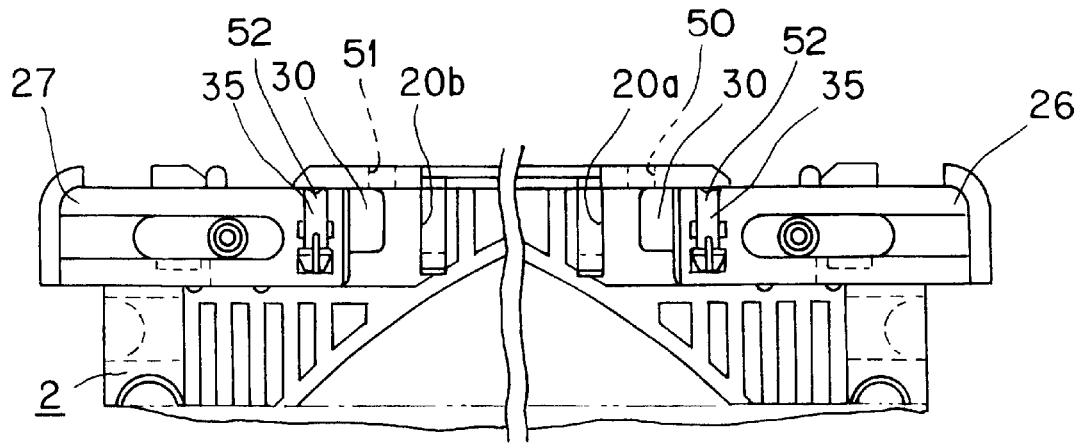
FIG. 29 is a plan view showing the state enabling the opening operation of the cover member mounted on the casing main member.

In the initial state of the container casing 1 of the present invention, the opening/closure controlling members 26, 27 are thrust into the inside of the containers 38, 39 of the casing main member 2, as shown in FIG. 28. At this time, the cover member 3 is closed with respect to the casing main member 2 for covering the disc housing section 4, with the paired engagement pieces 21a, 21b engaging in the engagement grooves 20a, 20b formed in the casing main member 2. At this time, the engagement projections 30 of the first and second opening/closure controlling members 26, 27 are inserted into the engagement openings 21c, 21d formed in the engagement pieces 21a, 21b of the cover member 3 to control the opening movement of the cover member 3. Moreover, the movement control pin 52 is inserted from the control pin inserting openings 50, 51 formed in the back side 2b of the casing main member 2 as far as the pin inserting opening 35 and the first opening 32a formed in the opening/closure controlling members 26, 27 to control the movement of the opening/closure controlling members 26, 27. Thus, in the initial state of the container casing 1, the disc housing section 4 is kept closed by the cover member 3 to prevent the risk of the cover member 3 being opened to injure the optical disc 200 held in the disc housing section 4 under the shock of, for example, descent.

In the state of the container casing 1, shown in FIG. 28, the first and second opening/closure controlling members 26, 27 are immersed in the casing main member 2, without being protruded from the sides 2a, 2b of the casing main member 2, so that the container casing 1 can be introduced into the disc drive device via the disc loading/unloading opening without being obstructed by the first and second opening/closure controlling members 26, 27.

With the container casing 1 according to the present invention, the cover member 3 can be opened relative to the casing main member 2, by the movement control pin 52 being thrust into the inside of the first and second opening/closure controlling members 26, 27 for projecting the opening/closure controlling members 26, 27 from the sides 2a, 2b of the casing main member 2. That is, when the movement control pin 52 is thrust towards the first and second opening/closure controlling members 26, 27 until it is completely accommodated therein, the first and second opening/closure controlling members 26, 27 are disengaged from the casing main member 2 and enabled to be moved. When the first and second opening/closure controlling members 26, 27 are moved in a direction of being protruded from the sides 2a, 2b of the casing main member 2, the engagement projections 30 of the opening/closure controlling members 26, 27 are extracted from the engagement openings 21c, 21d formed in the engagement pieces 21a, 21b of the cover member 3 to enable the opening movement of the cover member 3.

When the first and second opening/closure controlling members 26, 27 are protruded from the sides 2c, 2d of the casing main member 2, the container casing 1 is increased in width to control the insertion of the container casing 1 into the disc drive device by the first and second opening/closure controlling members 26, 27 via the disc loading/unloading opening. That is, when the cover member 3 is enabled to be opened, the container casing 1 is controlled in loading on the disc drive device to prevent reliably the risk of the cover member 3 being opened with the container casing 1 loaded on the disc drive device to cause decent of the optical disc 200.

Meanwhile, the movement control pin 52 cannot be restored to its original position when the movement control pin 52 is once thrust into the first and second opening/closure controlling members 26, 27. With the present container casing 1, in which the movement control pin 52, once thrust, cannot be restored to the original position, it can be discerned whether the cover member 3 has been opened by checking the status of the movement control pin 52.

The present invention is not limited to the embodiments described since it can be optionally changed on the basis of the technical concept of the invention. In particular, the disc-shaped recording medium held in the container casing is not limited to a optical disc and may also be a variety of optical discs or magnetic discs.

INDUSTRIAL APPLICABILITY

In a container casing according to the present invention, an opening/closure controlling member for controlling the opening movement of a cover member is provided on a casing main member or a cover member and the opening or control of opening of the cover member occurs responsive to the movement position of the opening/closure controlling member, so that the cover member can be prevented from being opened inadvertently to assure positive protection of the disc-shaped recording medium held in the casing main member.

Also, the container casing has a control pin for controlling movement of the opening/closure controlling member controlling the opening/closure of the cover member to make it possible to control inadvertent movement of the opening/closure controlling member to prevent inadvertent opening of the cover member.

Since the container casing has a mistaken recording inhibiting member, it is possible to prevent inadvertent erasure of pre-recorded signals if signal recording enabling disc-shaped recording medium is held in the container casing to assure reliable protection of the information recorded on the disc-shaped recording medium.

Since the shutter member movably mounted on the casing main member can be moved in stability along the length of the casing main member, the shutter member can be protected reliably, while the disc-shaped recording medium held in the casing main member can be protected reliably.

What is claimed is:

1. A container casing for a disc-shaped recording medium for rotatably accommodating the disc-shaped recording medium, comprising:

a main casing member having a disc housing section for holding the disc-shaped recording medium on its major surface, an aperture for recording and/or reproducing the disc-shaped recording medium held in said disc housing section and a center opening for rotationally driving the disc-shaped recording medium held in said disc housing section;

a cover member mounted on said main casing member for opening/closing the disc housing section;

an opening/closure controlling member mounted on one of the casing main member and the cover member, said opening/closure controlling member being movable in a first direction of movement between a first position, wherein the other of the casing main member and the cover member is engaged thereby for keeping the closed state of the disc housing section by said cover member, and a second position, wherein said cover member can be opened, with the opening/closure controlling member being then disengaged from the other of the casing main member and the cover member; and pin control means cooperating with an opening of said opening/closure controlling member for controlling the movement of said opening/closure controlling member between its said first and second positions.

2. The container casing for the disc-shaped recording medium according to claim 1 wherein the cover member opening/closing said disc housing section has a center magnetic plate.

3. The container casing for the disc-shaped recording medium according to claim 1 wherein said opening/closure controlling member is mounted on one of the casing main member and the cover member so that, when the opening/closure controlling member is moved to said second position, the opening/closure controlling member is protruded outwardly in a direction perpendicular to the inserting direction of the casing main member into the disc drive device.

4. The container casing for the disc-shaped recording medium according to claim 3 wherein a pair of said opening/closure controlling members are arranged on left and right sides of said casing main member and, when moved to said second position enabling the opening of said cover member, the length of said casing main member in a direction perpendicular to the direction of insertion thereof into the disc drive device is set so as to be longer than the length in the inserting direction of the casing main member into the disc drive device.

5. The container casing for the disc-shaped recording medium according to claim 4 wherein said pair of the opening/closure controlling members arranged on left and right sides of said casing main member are of identical shape.

6. The container casing for the disc-shaped recording medium according to claim 1 wherein said first operating portion for moving said opening/closure controlling member to said first position is provided on one end in the movement direction of the opening/closure controlling member and wherein on the opposite end in the movement direction of the opening/closure controlling member, an engagement projection is engaged in an opening provided in said casing main member or the cover member to maintain the cover member in the state of closing the disc housing section when said opening/closure controlling member is moved to said first position.

7. The container casing for the disc-shaped recording medium according to claim 6 wherein the engagement projection formed at the other end in the movement direction of said opening/closure controlling member has an engagement guide surface in its forward end in the direction of engaging with an engagement portion provided on said casing main member or the cover member.

8. The container casing for the disc-shaped recording medium according to claim 1 wherein a second operating portion for moving said opening/closure controlling member to said second position is provided at an end face of the opening/closure controlling member in the direction perpendicular to the movement direction, a second operating portion for moving the opening/closure controlling member to said second position is provided at the opposite end face of the opening/closure controlling member in the direction perpendicular to the movement direction and wherein positioning means is provided at the opposite end face in the direction perpendicular to the movement direction for engaging with an engagement portion provided on the casing main member when said opening/closure controlling member is moved to said first or second position.

9. The container casing for the disc-shaped recording medium according to claim 1 wherein said pin control means further comprises:

an opening control pin movable between an opening controlling position for controlling movement of said opening/closure controlling member from the first position to said second position to control the opening of said cover member and an opening enabling position of enabling movement of said opening/closure controlling members from the first position to the second position to enable opening of said cover member.

10. The container casing for the disc-shaped recording medium according to claim 9 wherein an opening passed through by said opening control pin is provided in each of the casing main member and the opening/closure controlling member, said opening controlling pin when positioned in said opening controlling position being inserted through the opening in the casing main member and the opening in said opening/closure controlling member, said opening controlling pin when positioned in said opening enabling position being moved to a position inserted in the opening in said opening/closure controlling member.

11. The container casing for the disc-shaped recording medium according to claim 10 wherein said opening controlling pin has a retention pawl on its peripheral surface and wherein, when the opening controlling pin is moved to said opening position, said retention pawl is engaged in a retainer provided on said opening/closure controlling member, said opening controlling pin being disabled to be restored to said opening controlling position after said retention pawl is engaged with the retainer provided on said opening/closure controlling member.

12. The container casing for the disc-shaped recording medium according to claim 10 wherein said opening controlling pin has slits extending in the movement direction so as to be elastically deformable by said slits, said opening/closure controlling member being thrust and disposed in the opening in the casing main member and/or the opening in said opening/closure controlling member.

13. The container casing for the disc-shaped recording medium according to claim 1 wherein said opening/closure controlling member has a hole for producing a spacing to permit elastic deformation thereof in a direction perpendicular to the thrusting direction into the casing main member to enable thrusting engagement thereof into the casing main member.

14. The container casing for the disc-shaped recording medium according to claim 1 wherein projection or recesses are formed on the major surface of the casing main member on an outer peripheral side of the disc housing section arranged on said major surface and wherein recesses or projections mating with the projections or recesses on the major surface of the casing main member on closure of the disc housing section are formed on said cover member.

15. The container casing for the disc-shaped recording medium according to claim 1 wherein a finger support recess is formed on the casing main member for extending from its lateral surface to the disc housing section and wherein said cover member is provided with a projection engaged in the finger support recess formed in the casing main member on closure of the disc housing section.

16. A container casing for rotatably accommodating a disc-shaped recording medium, comprising:

a main casing member having a disc housing section for holding the disc-shaped recording medium on its major surface, an aperture for recording and/or reproducing the disc-shaped recording medium held in said disc housing section and a center opening for rotationally driving the disc-shaped recording medium held in said disc housing section;

a shutter member movably mounted on said casing main member for opening/closing said aperture and the center opening:

a shutter supporting member for supporting one end of said shutter member;

a cover member mounted on said main casing member for opening/closing the disc housing section;

an opening/closure controlling member mounted on one of the casing main member and the cover member, said opening/closure controlling member being movable between a first position, wherein the other of the casing main member and the cover member is engaged thereby for keeping the closed state of the disc housing section by said cover member, and a second position, wherein said cover member can be opened with the opening/closure controlling member being then disengaged from the other of the casing main member and the cover member; and pin control means cooperating with an opening of said opening/closure controlling member for controlling the movement of said opening/closure controlling member between its said first and second positions.

17. The container casing for the disc-shaped recording medium according to claim 16 wherein said opening/closure controlling member has a hole for producing a spacing to permit elastic deformation thereof in a direction perpendicular to the thrusting direction into the casing main member to enable thrusting engagement thereof into the casing main member, and wherein said shutter member has a protrusion introduced into the hole of the opening/closure controlling member, said protrusion being introduced into the hole of the opening/closure controlling member to prevent detachment of the opening/closure controlling member from the casing main member or the cover member.

18. The container casing for the disc-shaped recording medium according to claim 17 wherein, on each end of the casing main member in a direction perpendicular to the inserting direction into the disc drive device of the casing main member, there is provided a positioning recess into which is introduced the projection of the shutter supporting member for positioning said projection.

19. The container casing for the disc-shaped recording medium according to claim 18 wherein one of the positioning recesses provided in both ends of the casing main member in a direction perpendicular to the inserting direction of the casing main member into the disc drive device is substantially of the same diameter as the outer diameter of the projection of the shutter supporting member and wherein the other positioning recess has a diameter along the movement direction of the shutter member is larger than the outer diameter of the protrusion of the shutter supporting member.

20. The container casing for the disc-shaped recording medium according to claim 17 wherein said projection of the shutter supporting member is secured to said casing main member.

21. The container casing for the disc-shaped recording medium according to claim 16 wherein said shutter supporting member is mounted on said casing main member so that one end of the shutter supporting member is spaced a pre-set gap from the surface of the casing main member along the movement direction of the shutter member, said shutter member having its one end inserted into said gap to prevent the shutter member from being detached from the surface of the casing main member; and wherein an interrupted weld projection having at least one cut-out is provided on a connection surface of said shutter supporting member or the casing main member and wherein the other connection surface is roughed.

22. The container casing for the disc-shaped recording medium according to claim 21 wherein said connection surface presents plural chevron-shaped ribs to provide said roughed surface.

23. The container casing for the disc-shaped recording medium according to claim 16 wherein said shutter supporting member is mounted on said casing main member so that one end of the shutter supporting member is spaced a pre-set gap from the surface of the casing main member along the movement direction of the shutter member, said shutter member having its one end inserted into said gap to prevent the shutter member from being detached from the surface of the casing main member;

both ends of the shutter supporting member covering one end of the shutter member having weld points for ultrasonic welding;

both corners in the movement direction of one end of the shutter member having cut-outs for preventing conflict with said weld points for ultrasonic welding.

24. A container casing for rotatably accommodating a disc-shaped recording medium, comprising:

a main casing member having a disc housing section for holding the disc-shaped recording medium on its major surface, an aperture for recording and/or reproducing the disc-shaped recording medium held in said disc housing section and a center opening for rotationally driving the disc-shaped recording medium held in said disc housing section;

a cover member mounted on said main casing member for opening/closing the disc housing section; and an elastically deformable mistaken recording inhibiting member positioned for enabling recording of information signals on the disc-shaped recording medium housed in said disc housing section for inhibiting recording of information signals on the disc-shaped recording medium;

said casing main member having a mistaken recording inhibiting member container formed by forming an insertion opening on a lateral side perpendicular to the major surface thereof defining said disc housing section, said mistaken recording inhibiting member being introduced in said casing main member from the lateral side of the casing main member via said insertion opening upon elastic deformation thereof.

25. The container casing for the disc-shaped recording medium according to claim 24 wherein an opening communicating with said mistaken recording inhibiting member container is formed in each of the one and other major surfaces of the casing main member, and wherein said mistaken recording inhibiting member has an exposed portion exposed to a lateral side of said casing main member and first and second elastic deformation pieces extended from said exposed portion for elastic deformation in a direction towards and away from each other;

said first elastic deformation piece being exposed to outside via said opening.

26. The container casing for the disc-shaped recording medium according to claim 24 wherein said mistaken recording inhibiting member has an exposed portion exposed to a lateral side of said casing main member and first and second elastic deformation pieces extended from said exposed portion for elastic deformation in a direction towards and away from each other;

said second elastic deformation piece having means for positioning said mistaken recording inhibiting member, said mistaken recording inhibiting member container having an engagement portion engaged with the positioning means, said positioning means engaging with said engagement means when the mistaken recording inhibiting member is positioned at a position of enabling recording information signals on a disc-shaped recording medium held in said container casing or at a position inhibiting recording of information signals on said disc-shaped recording medium.

27. A container casing for rotatably housing a disc-shaped recording medium comprising:

a main casing member having a disc housing section for holding the disc-shaped recording medium towards its major surface, an aperture for recording and/or reproducing the disc-shaped recording medium held in said disc housing section and a center opening for rotationally driving the disc-shaped recording medium held in said disc housing section;

a cover member rotatably mounted via a fulcrum on said casing main member for opening/closing said disc housing section wherein said cover member including a pair of mounting members for mounting the cover member on said casing main member and is rotatably supported thereon with shank portions of the mounting members providing for a center of rotation; and rotation controlling means provided on said fulcrum for holding the cover member at a position of opening the disc housing section when the cover member is rotated to a position of opening said disc housing section wherein said rotation controlling means includes a projection provided on the peripheral surfaces of each of said shank portions for limiting rotational movement of said cover member.

28. The container casing for the disc-shaped recording medium according to claim 27 wherein said projection is engaged in a recess of said casing main member when the cover member is in its closed condition to thereby limit free rotation of said shank portions.

29. The container casing for the disc-shaped recording medium according to claim 28 wherein said rotary shaft is provided on the cover member;

said casing main member having an elastic clamping portion for being elastically deformed for clamping said shank portions; and wherein said cover member having said shank portions clamped by said elastic clamping portion for being rotatably mounted on said casing main member, said projection compressing against at least a portion of said elastic clamping portion for controlling rotation of said cover member.

* * * * *